United States Patent
Ishii

(10) Patent No.: US 7,756,209 B2
(45) Date of Patent: Jul. 13, 2010

(54) APPARATUS, METHOD, AND PROGRAM FOR IDENTIFYING MODULATION MODE

(75) Inventor: Hiroyuki Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 922 days.

(21) Appl. No.: 11/556,458

(22) Filed: Nov. 3, 2006

(65) Prior Publication Data

US 2008/0107191 A1 May 8, 2008

(51) Int. Cl.
*H04K 1/10* (2006.01)
(52) U.S. Cl. .................. 375/260; 375/324; 375/343; 375/355; 375/366; 370/204; 370/208; 370/210
(58) Field of Classification Search .............. 370/204, 370/208, 210; 375/324, 260, 355, 366
See application file for complete search history.

(56) References Cited

U.S. PATENT DOCUMENTS

| | | | |
|---|---|---|---|
| 6,654,429 B1 | 11/2003 | Li | |
| 6,868,130 B2 * | 3/2005 | Lee | 375/324 |
| 7,170,945 B2 * | 1/2007 | Blat | 375/260 |
| 7,292,651 B2 | 11/2007 | Li | |
| 7,570,577 B2 * | 8/2009 | Ishii | 370/204 |
| 2004/0228270 A1 * | 11/2004 | Chen et al. | 370/210 |
| 2005/0163238 A1 * | 7/2005 | Fujii | 375/260 |
| 2006/0140293 A1 * | 6/2006 | Lai et al. | 375/260 |
| 2007/0086329 A1 * | 4/2007 | Glazko et al. | 370/208 |
| 2008/0107191 A1 | 5/2008 | Ishii | |
| 2009/0067515 A1 | 3/2009 | Galperin et al. | |

FOREIGN PATENT DOCUMENTS

| | | |
|---|---|---|
| JP | 08-125630 A | 5/1996 |
| JP | 2001-086171 | 3/2001 |
| JP | 2001-211137 | 8/2001 |
| JP | 2002-232389 | 8/2002 |
| JP | 2003-264527 | 9/2003 |
| JP | 2003-319005 | 11/2003 |

OTHER PUBLICATIONS

IEEE Standard 802.11a-1999 (Supplement to IEEE Standard 802.11-1999), Part II: Wireless LAN Medium Access Control (MAC) and Physical Layer (PHY) specifications: Highs-speed Physical Layer in the GHZ Band, pp. 1-82 (Copyright 1999).
Ochi Hiroshi, OFDM System Technology MATLAB Simulation Guide, pp. 53-71 (published by TRICEPS, Inc.), Sep. 2002.

* cited by examiner

*Primary Examiner*—Sudhanshu C Pathak
(74) *Attorney, Agent, or Firm*—Dickstein, Shapiro, LLP.

(57) ABSTRACT

An orthogonal frequency division multiplex signal and a digital modulation signal or an analog modulation signal can be identified by blind processing. The modulation mode identifying apparatus comprises: a correlation signal generating circuit which generates a duplicate signal for correlation processing based on an unknown communication signal; an autocorrelation circuit which performs autocorrelation processing through carrying out sliding processing on the duplicate signal with respect to the unknown communication signal; a detection unit which detects information regarding a pilot symbol and a guide interval symbol of the communication signal based on a correlation value output obtained by the autocorrelation processing; and an identifying circuit which identifies a modulation mode of the unknown communication signal based on the information regarding the pilot symbol and the guide interval symbol of the communication signal.

12 Claims, 15 Drawing Sheets

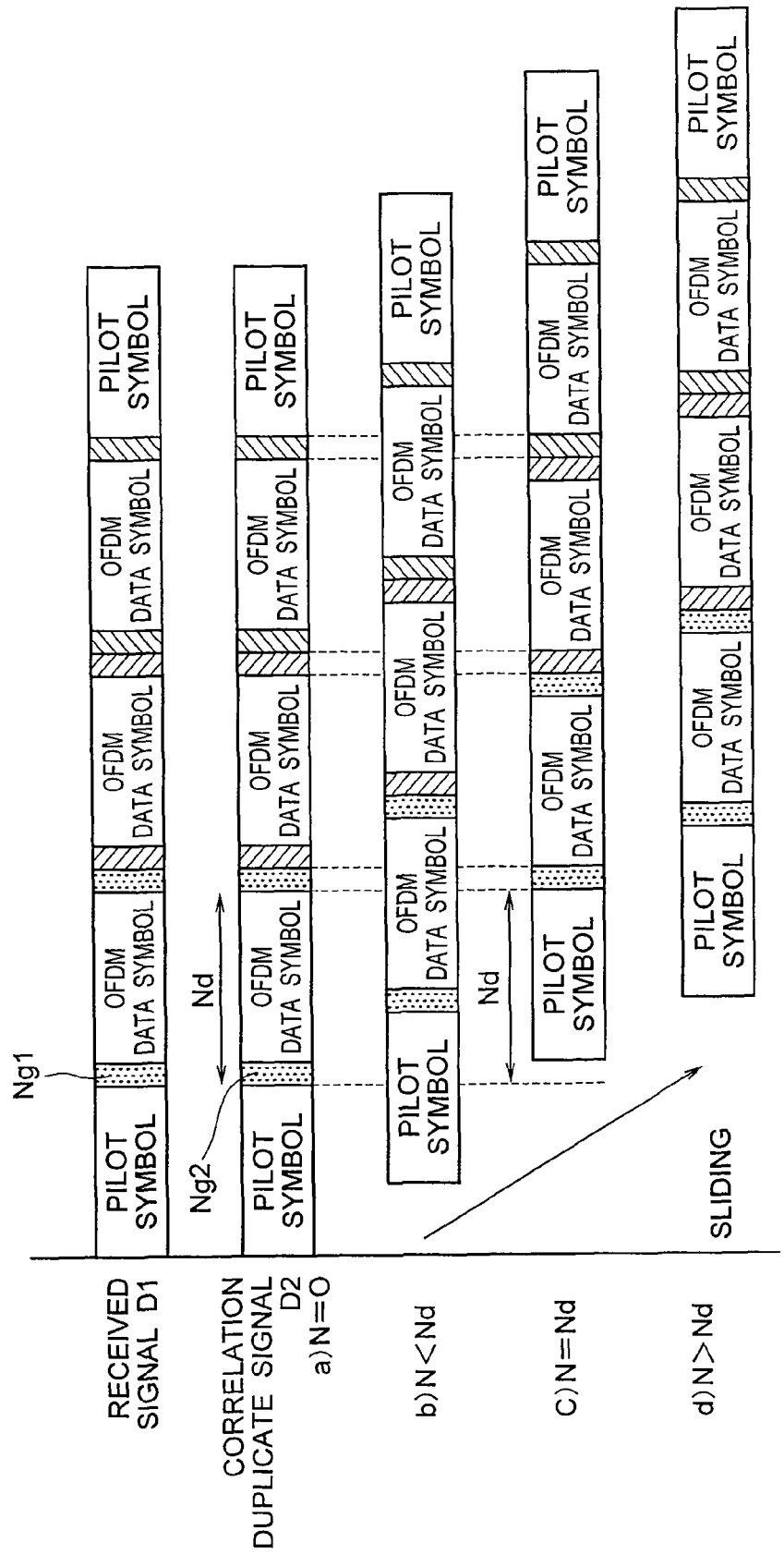

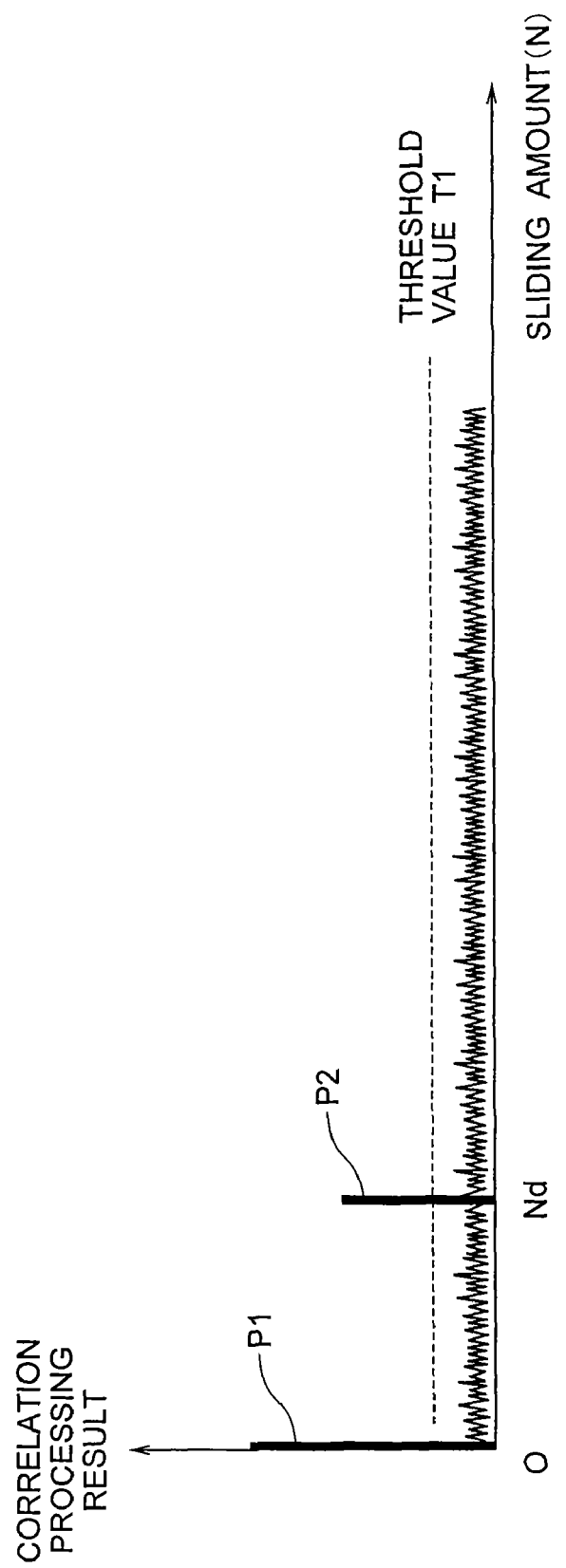

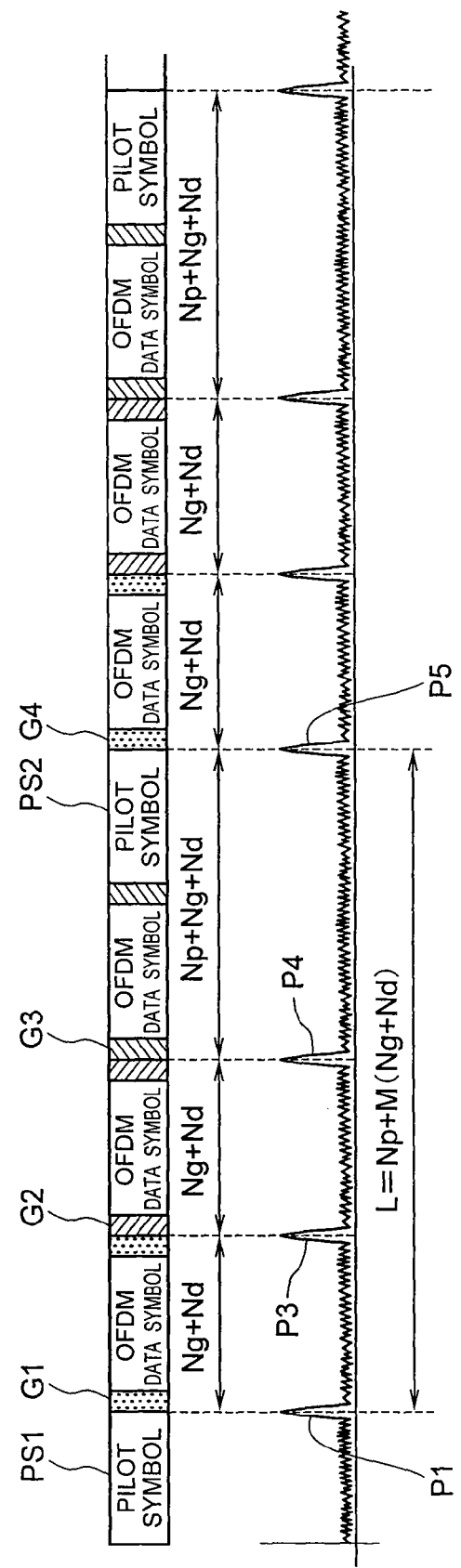

FIG.12A OFDM SIGNAL
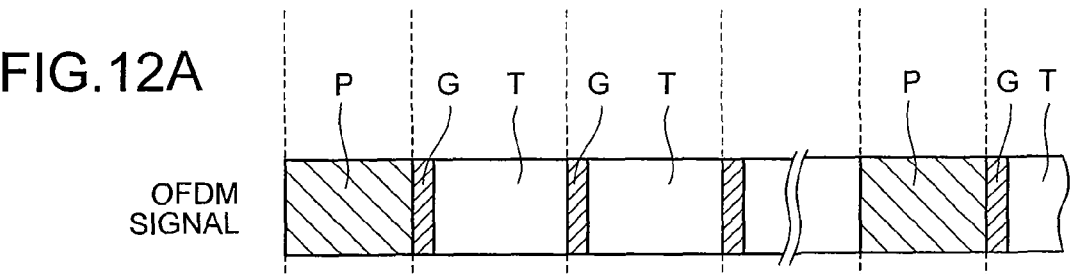
FIG.12B DIGITAL MODULATION SIGNAL
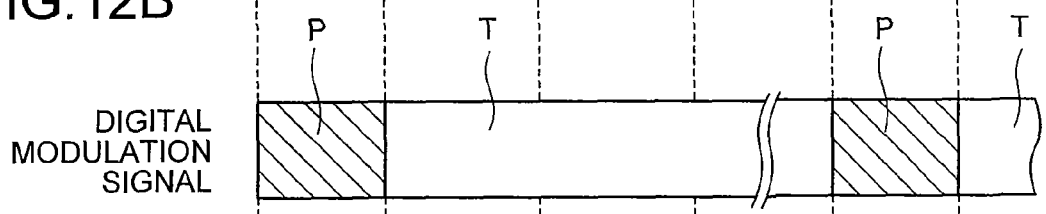
FIG.12C ANALOG MODULATION SIGNAL
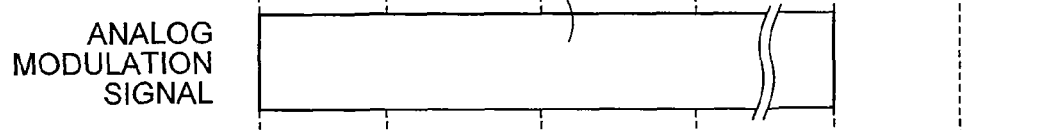
FIG.12D OFDM SIGNAL
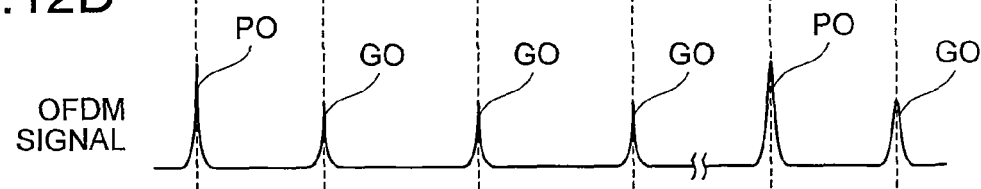
FIG.12E DIGITAL MODULATION SIGNAL
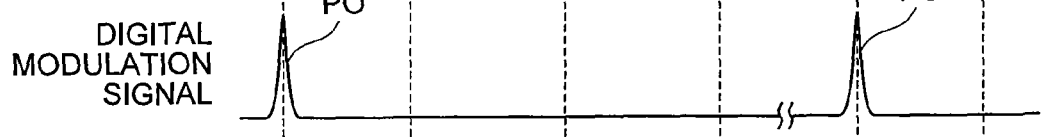
FIG.12F ANALOG MODULATION SIGNAL

FIG.13

| MODULATION MODE | GUARD INTERVAL SYMBOL (PERIOD SIGNAL) | PILOT SYMBOL |
|---|---|---|
| OFDM SIGNAL | YES | YES |
| DIGITAL MODULATION SIGNAL | NO | YES |
| ANALOG MODULATION SIGNAL | NO | NO |

APPARATUS, METHOD, AND PROGRAM FOR IDENTIFYING MODULATION MODE

BACKGROUND OF THE INVENTION

1. Field of the Invention

The present invention relates to an apparatus, a method, and a program used for identifying a modulation mode.

2. Description of the Related Art

As a type of multiplex modulation signals, there is an orthogonal frequency division multiplex (OFDM) signal. The communication system using the OFDM signal uses a plurality of sub-carriers whose center frequencies are different from each other, thereby providing a high frequency efficiency. In addition, it transmits transmission signals by multi-carrier signals so that it exhibits a strong resistance for interference. Therefore, the communication system using the OFDM signal has been actively applied to various kinds of communication systems such as radio LAN and the like (for example, Patent Literature 1). As has been selected for one of the radio LAN standard, it is a characteristic of the OFDM signal to have a structure in which a pilot symbol applied to synchronizing processing and a guard interval symbol for reducing the influence of multi-paths and for being applied to the synchronizing processing are added to an OFDM symbol to be transmitted (Non-Patent Literature 1).

FIG. 1A shows an example of the OFDM signal structure to which the present invention can be applied. As the fundamental structure of an OFDM signal frame, a pilot symbol for synchronizing processing is arranged at the front and, following the pilot symbol, the type of communication signal and a plurality of OFDM data symbols as transmission data are arranged. In FIG. 1A, Np is the pilot symbol length, Ng is the guard interval symbol length, Nd is the OFDM data symbol length, and M is the number of the OFDM data symbols.

As shown in FIG. 1B, for performing synchronizing processing and reducing the influence by multi-paths, a signal, which is a copy of a part of the OFDM signal to be transmitted, is added to the front of each OFDM data symbol as the guard interval symbol.

In conventional OFDM signal detection and demodulation processing, synchronizing and demodulation processing are performed on an assumption that the pilot symbol length Np, the guard interval symbol length Ng, the OFDM data symbol length Nd, and the number M of the OFDM data symbols per frame are known to a reception side in advance as information.

In the OFDM communication system in which the modulating parameters are uniquely changed by a transmission side in accordance with the communication quality, it is important to detect the modulating parameters based on a received signal in the demodulation processing performed on the reception side. With this, data communication for informing a change of parameters becomes unnecessary so that an increase in the data transmission capacity can be expected. Further, in a system for monitoring illegal radio waves, these parameters are generally unknown so that it is necessary to extract the parameters from the received signal.

As one of the conventional processing methods, there are two ways described in Non-Patent Literature 2 in regards to synchronizing demodulation method on condition that the above-described parameters are already known. One is a method in which a PN-system pilot symbol is added to the front of an OFDM signal block and the principle of CDMA matched filter is used. From a result of the correlation value output (see Non-Patent Literature 2, pp. 82-85), the method achieves frame synchronizing processing of the OFDM signal, and synchronizing and demodulation processing by detecting the phase error caused by radio wave propagation.

The other one of the conventional processing method is synchronizing demodulation processing using the guard interval symbol. In this method, in a circuit shown in FIG. 2 (see Non-Patent Literature 2, p. 57, FIG. 4.2, guard-interval-symbol-type synchronizing circuit), two data windows for correlation processing, which have time delay difference for the data length of the OFDM data symbol, are used for input signals, and synchronizing and demodulation processing are performed based on the correlation result. In FIG. 2, T is the OFDM block length without the guard interval symbol, and Tg is the guard interval symbol length.

[Patent Literature 1] Japanese Patent Unexamined Publication No. 2001-211137

[Non-Patent Literature 1] IEEE Standard 802.11a-1999, p. 12, 17.3.3 PLCP preamble (SYNC) FIG. 110-OFDM training structure

[Non-Patent Literature 2] "OFDM System Technology and MATLAB Simulation Guide" by Ochi Hiroshi, pp. 53-71, published by TRICEPS, Inc., However, it is necessary in the first processing method disclosed in the above-described Non-Patent Literature 2 to perform the correlation processing on an assumption that the reception side knows the length and the system of the pilot symbol which is added to the transmission signal. Further, the second processing method disclosed in Non-Patent Literature 2 achieves the effect of its action only when the data length of the OFDM symbol is already known.

As described above, the conventional OFDM modulation circuit is operable only when the modulating parameters of the OFDM signal are known, and it does not properly operate when there is input of a signal whose modulating parameters of the OFDM signal are unknown.

SUMMARY OF THE INVENTION

The object of the present invention therefore is to provide an apparatus, a method, and a program for identifying a multiplex modulation mode without known information.

In order to achieve the foregoing object, the modulation mode identifying apparatus according to the present invention comprises: a correlation signal generating circuit which generates a duplicate signal for correlation processing based on an unknown communication signal; an autocorrelation circuit which performs autocorrelation processing through carrying out sliding processing on the duplicate signal with respect to the unknown communication signal; a detection unit which detects information regarding a pilot symbol and a guide interval symbol of the communication signal based on a correlation value output obtained by the autocorrelation processing; and an identifying circuit which identifies a modulation mode of the unknown communication signal based on the information regarding the pilot symbol and the guide interval symbol of the communication signal.

The orthogonal frequency division multiplex signal includes the pilot symbol and the guide interval symbol, and the digital modulation signal includes only the pilot symbol, whereas the analog modulation signal includes neither symbol.

The present invention is distinctive in respect that it identifies the modulation mode of the unknown communication signal by paying attention to the presence of the symbols without having the known information regarding the modulation mode. That is, in the present invention, the correlation signal generating circuit generates the duplicate signal for the correlation processing based on the unknown communication signal, when receiving the unknown communication signal. Then, the autocorrelation circuit performs the autocorrelation processing through carrying out the sliding processing on the duplicate signal with respect to the unknown communication signal. Subsequently, the detection unit detects the information regarding the pilot symbol and the guard interval symbol of the communication signal based on the correlation value output obtained by the autocorrelation processing. Further, the identifying circuit identifies the modulation mode of the unknown communication signal based on the information regarding the pilot symbol and the guard interval symbol of the communication signal.

When the received communication signal includes the pilot symbol and the guard interval symbol, the identifying circuit identifies the unknown communication signal as the orthogonal frequency division multiplex signal. When the received unknown communication signal includes only the pilot symbol, the identifying circuit identifies the unknown communication signal as the digital modulation signal. Further, when the received unknown communication signal includes neither the pilot symbol nor the guard interval symbol, the identifying circuit identifies the unknown communication signal as the analog modulation signal.

As described above, it is possible with the present invention to identify the modulation mode based on the symbols contained in the unknown communication signal, by paying attention to the characteristics of the communication signal, i.e. the presence of the pilot symbol and the guard interval symbol.

In the above, there has been described by referring to the case where the present invention is built as an apparatus. However, it is not limited to that. The present invention may be employed as a method.

The modulation mode identifying method according to the present invention that has been devised based on the above-described concept comprises the steps of: a generating step for generating a duplicate signal for correlation processing based on an unknown communication signal; an autocorrelation step for performing autocorrelation processing through carrying out sliding processing on the duplicate signal with respect to the unknown communication signal; a detecting step for detecting information regarding a pilot symbol and a guide interval symbol of the communication signal based on a correlation value output obtained by the autocorrelation processing; and an identifying step for identifying a modulation mode of the unknown communication signal based on the information regarding the pilot symbol and the guide interval symbol of the communication signal.

The present invention generates the duplicate signal of the unknown communication signal, performs autocorrelation processing through carrying out the sliding processing on the duplicate signal with respect to the unknown communication signal, obtains the information regarding the various symbols based on the correlation output of the autocorrelation processing, and identifies the modulation mode based on the symbol information.

The present invention obtains the information for identifying the modulation mode from the unknown communication signal. Therefore, the present invention requires no known information.

Although the above-described modulation mode identifying apparatus according to the present invention has been built as a hardware apparatus, it is not limited to that. The present invention may be built as a program to be installed in a computer for allowing the computer to execute the functions of the modulation mode identifying apparatus.

The modulation mode identifying program according to the present invention that has been built based on the above-described concept enables a computer, which constitutes the modulation mode identifying apparatus for identifying the modulation mode of the unknown communication signal, to execute: a function of generating a duplicate signal for correlation processing based on an unknown communication signal; a function of performing autocorrelation processing through carrying out sliding processing on the duplicate signal with respect to the unknown communication signal; a function of detecting information regarding a pilot symbol and a guide interval symbol of the communication signal based on a correlation value output obtained by the autocorrelation processing; and a function of identifying a modulation mode of the unknown communication signal based on the information regarding the pilot symbol and the guide interval symbol of the communication signal.

As described above, the present invention generates the duplicate signal of the unknown communication signal, performs autocorrelation processing through carrying out the sliding processing on the duplicate signal with respect to the unknown communication signal, obtains the information regarding the various symbols based on the correlation output of the autocorrelation processing, and identifies the modulation mode based on the symbol information. Therefore, it is possible with the present invention to identify the modulation mode of the unknown communication signal based on the information obtained from the unknown communication signal, without having known information.

Furthermore, the present invention pays attention to the characteristics that are relative to all the communication signals, i.e. the pilot symbol and the guard interval symbol. Thus, the present invention can be applied commonly to all of the received unknown communication signals. Therefore, the effects of the present invention can be fully achieved when applied to monitor the illegal radio waves or applied to the field of communication such as a communication system in which communication is performed by utilizing an unoccupied band regardless of the kind of the communication band.

BRIEF DESCRIPTION OF THE DRAWINGS

FIG. 5 is an illustration for describing sliding processing 102 and correlation processing 103 of FIG. 4;

FIG. 6 is an illustration for describing correlation peak detecting processing 104 of FIG. 4;

FIG. 11 is a characteristic diagram for showing a result of the correlation processing of FIG. 10B which is performed on a signal with a plurality of orthogonal frequency division multiplex signal frames;

FIG. 12A, FIG. 12B, and FIG. 12C show the characteristics of the orthogonal frequency division multiplex signal, the digital modulation signal, and the analog modulation signal which can be identified by the embodiment of the present invention, and FIG. 12D, FIG. 12E, and FIG. 12F are characteristic diagrams for showing the pilot symbol and the guard interval symbol appeared after the correlation processing;

FIG. 13 is a table for showing common features and differences of the orthogonal frequency division multiplex signal, the digital modulation signal, and the analog modulation signal;

DETAILED DESCRIPTION OF THE PREFERRED EMBODIMENTS

Now, embodiments of the present invention will be described in detail by referring to the accompanying drawings. As the fundamental structure, the embodiments of the present invention identify the modulation mode of unknown communication signals by studying characteristics of the received unknown communication signals, i.e. information regarding the existence and timing location of a pilot symbol and a guard interval symbol. The embodiments of the present invention will be described hereinafter more specifically.

First Embodiment

Figure 3:
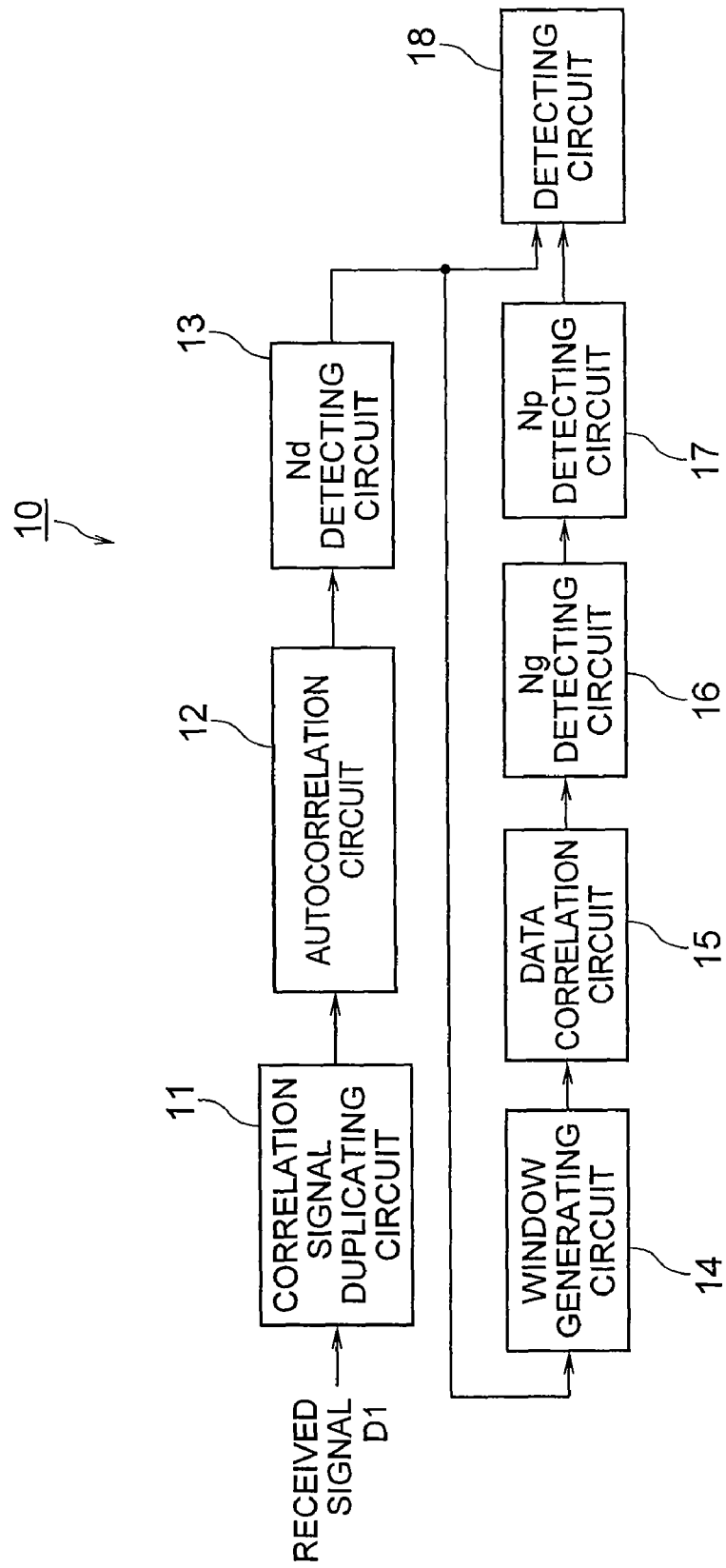
FIG. 3 is a functional block diagram for showing a modulation mode identifying apparatus for an orthogonal frequency division multiplex signal according to an embodiment of the present invention.

As shown in FIG. 3, a modulation mode identifying apparatus 10 according to the embodiment of the present invention comprises, as the fundamental structure: a correlation signal duplicating circuit 11 that generates a duplicate signal used for subsequent correlation processing; an autocorrelation circuit 12 for performing autocorrelation processing by correlating the duplicate signal with the unknown communication signal; a detection unit (comprising circuits 12, 13, 14, 15, 16, and 17) for detecting parametric information regarding the pilot symbol and the guide interval symbol of the communication signal based on the correlation value output obtained by the autocorrelation processing, and a detecting circuit 18 for identifying the modulation mode of the unknown communication signal based on the parametric information regarding the pilot symbol and the guard interval symbol of the unknown communication signal.

Figure 1A:
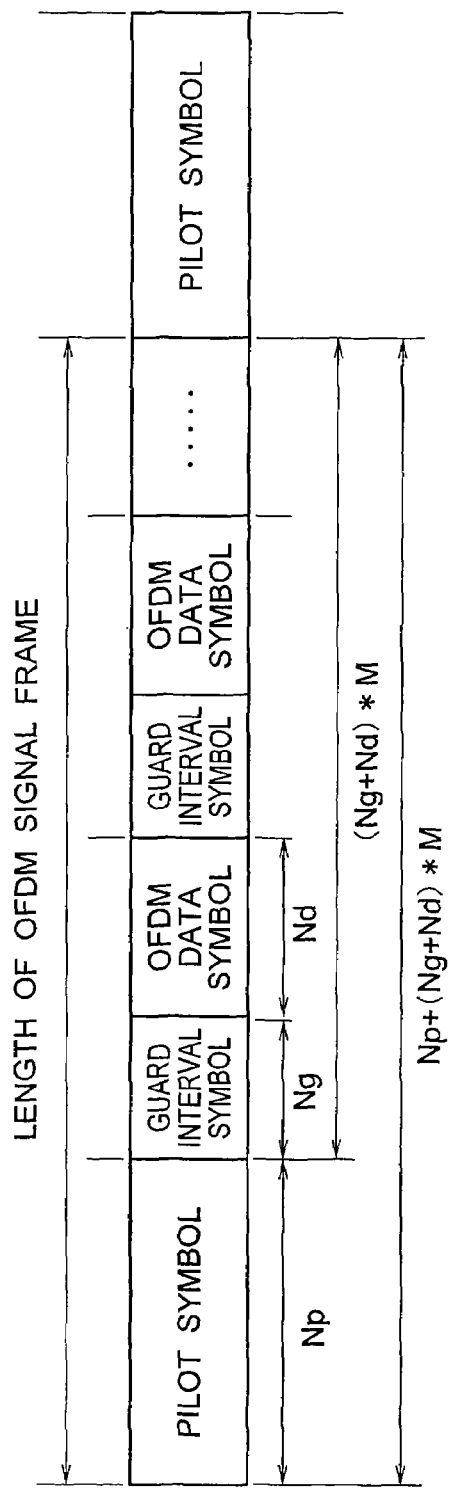
FIG. 1A is an illustration for describing an example of a frame structure of an orthogonal frequency division multiplex signal.
Figure 1B:
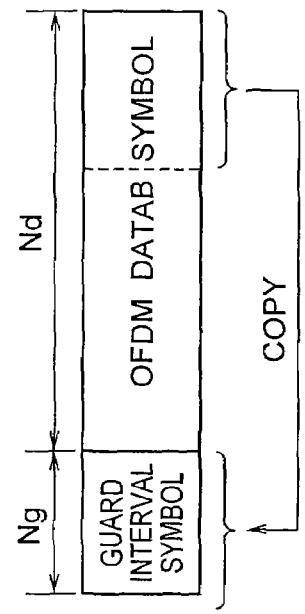
FIG. 1B is an illustration for describing a guard interval symbol.
Figure 2:
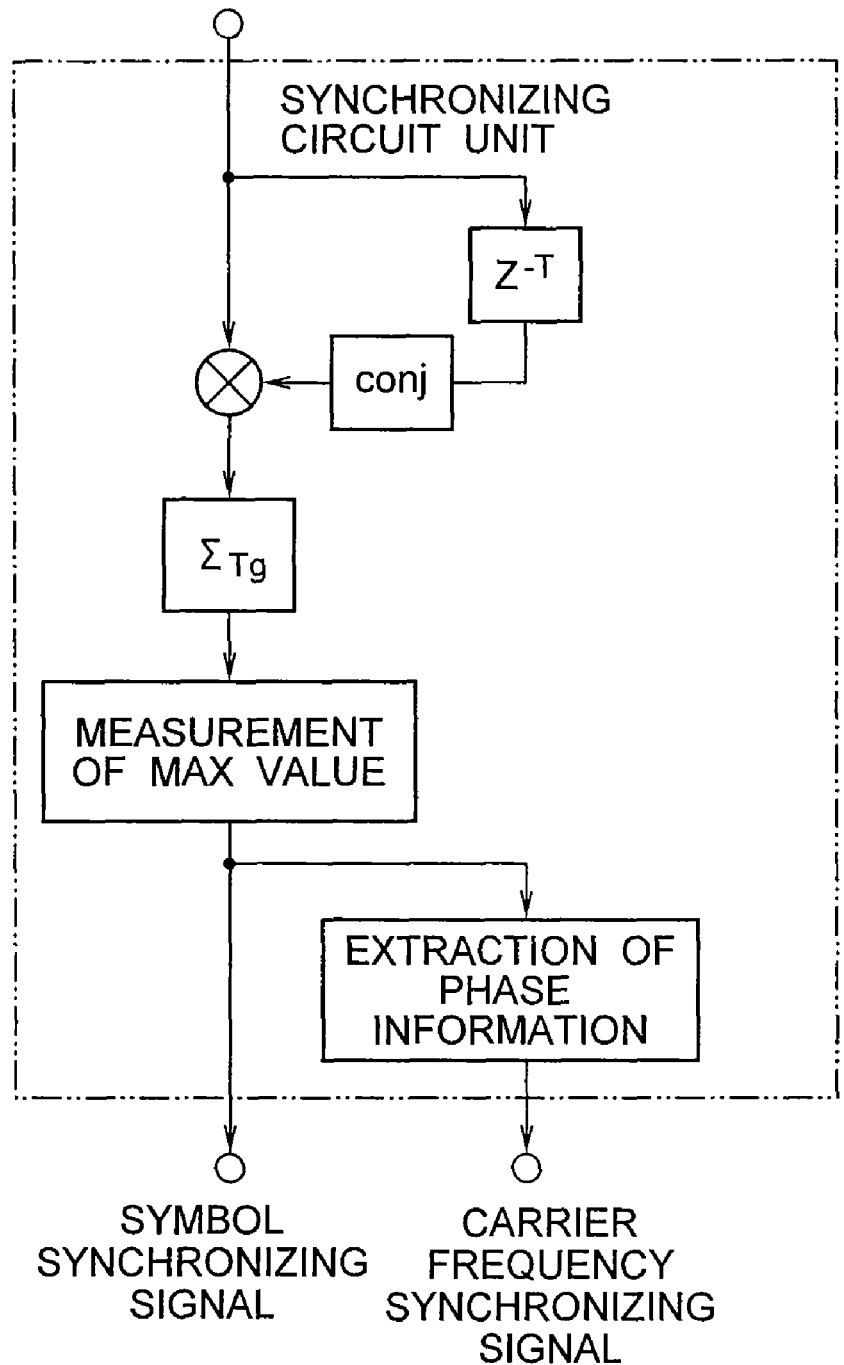
FIG. 2 is a block diagram for showing conventional synchronizing processing using the guard interval symbol.

The correlation signal duplicating circuit 11 generates a correlation duplicate signal D2, illustrated in FIG. 5, based on a received unknown communication signal D1. As shown in FIG. 5, the autocorrelation circuit 12 performs autocorrelation processing by carrying out a sliding processing of the correlation duplicate signal D2 generated by the correlation signal duplicating circuit 11. Autocorrelation circuit 12 slides correlating duplicate signal D2 in the time base direction with respect to the unknown communication signal D1, to perform a standard correlation. The autocorrelation circuit 12 sets a variable sliding amount (N). The initial value of the sliding amount (N) set in the autocorrelation circuit 12 is 0. One characteristic of an OFDM signal is that a copy of a part of the data symbol is added to the front of the data symbol as a guard interval symbol, as shown in FIG. 1B. Thus, when the autocorrelation circuit 12 performs the sliding processing of the duplicate signal D2 with respect to an OFDM signal the guard interval symbol in the OFDM signal will correlate with the guard interval symbol of the duplicate signal D2.

When the sliding amount N of the duplicate signal D2 with respect to the communication signal D1 is N<Nd, as in FIG. 5 at b), guard interval symbol Ng1 of the OFDM signal as the communication signal D1 and guard interval symbol Ng2 of the duplicate signal D2 are not aligned. Thus, the autocorrelation circuit 12 will not emit a large correlation value. When the sliding amount N by the autocorrelation circuit 12 is N=Nd, as in FIG. 5 at C), the guard interval symbol Ng2 of the duplicate signal D2 will be aligned with the copy of the OFDM signal Ng1. Thus, a large correlation value peak will be generated. When the sliding amount N by the autocorrelation circuit 12 is N>Nd as in FIG. 5 at d), the guard interval symbol Ng2 of the duplicate signal D2 will no longer be aligned.

The detection unit comprises an Nd detecting circuit 13, a window generating circuit 14, a data correlation circuit 15, an Ng detecting circuit 16, and an Np detecting circuit 17.

The Nd detecting circuit 13 pays attention to the correlation value peaks which are outputted as a result of correlation processing Correlation value peaks obtained from the guard interval symbols corresponding to the same signal components present within the communication signal D1 indicate the data symbol (OFDM data symbol) length Nd in the communication signal D1. The data symbol length Nd of the OFDM signal is detected by the Nd detecting circuit 13 When the sliding amount N by the autocorrelation circuit 12 for performing autocorrelation processing of the communication signal D1 and the duplicate signal D2 is N=0as FIG. 5 at a), the guard interval symbol Ng1 of the communication signal D1 and the guard interval symbol Ng2 of the duplicate signal D2 are consistent with each other. Thus, as shown in FIG. 6, a large correlation value peak P1 can be obtained. When the autocorrelation circuit 12 performs the autocorrelation processing by carrying out the sliding processing of the duplicate signal D2 with respect to the communication signal D1 with the sliding amount N=Nd as in FIG. 5 at C), the guard interval symbol Ng1 of the communication signal D1 and the guard interval symbol Ng2 of the duplicate signal D2 are consistent with each other. Thus, as shown in FIG. 6, a large correlation value peak P2 can be obtained. The guard interval symbol is added to the front of the OFDM signal so that the distance between the correlation value peak P1 which is outputted when the sliding amount N=0 and the correlation value peak P2 which is outputted when the sliding amount N=Nd corresponds to the OFDM data symbol length Nd of the OFDM signal.

Thus, the Nd detecting circuit 13 monitors the output state of the correlation value peak P1 which is obtained by the correlation processing of the guard interval symbol Ng1 of the communication signal D1 and the guard interval symbol Ng2 of the duplicate signal D2 when the autocorrelation circuit 12 performs the sliding processing with the sliding amount N=0, and stores and saves the data. Since the autocorrelation circuit 12 performs the correlation processing by changing the sliding amount N, the Nd detecting circuit 13 then monitors whether or not the correlation value peak is outputted, and detects the correlation value peaks P1, P2 shown in FIG. 6, which are obtained based on the guard interval symbols as the same signal components present in the communication signal D1. Thereby, Nd detecting circuit 13 detects the data symbol length Nd of the OFDM signal.

Further, as shown in FIG. 6, the Nd detecting circuit 13 detects the correlation value peaks P1, P2 using a threshold value T1 which can be set variably. Detection of the correlation value peaks P1, P2 by using the threshold value T1 is advantageous in respect that it can improve the accuracy of detecting the OFDM data symbol length Nd by the Nd detecting circuit 13.

Figure 7A:
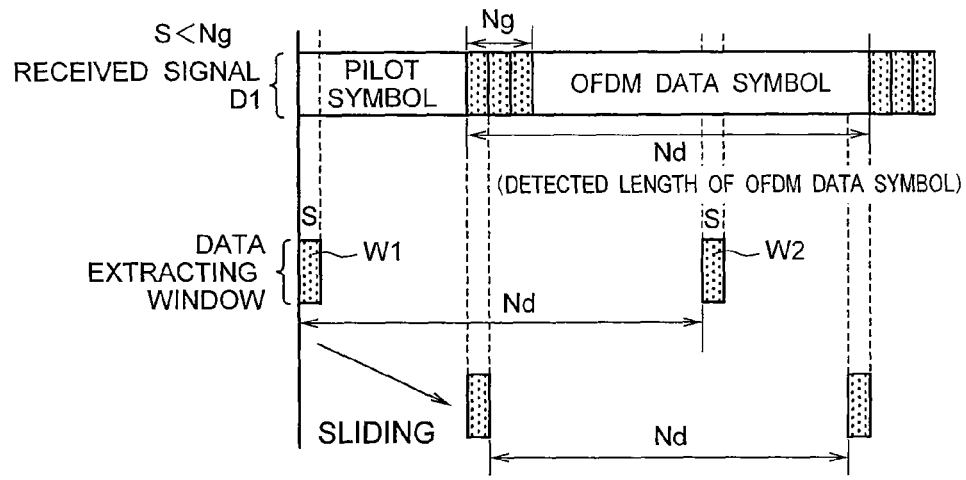
FIG. 7 is an illustration for describing sliding processing 106 and correlation processing 107 of FIG. 4.
Figure 7B:
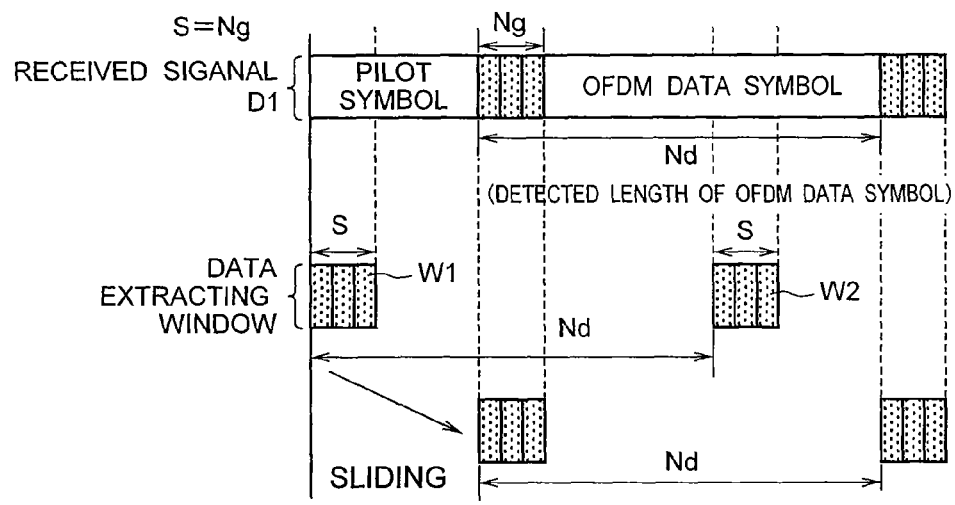
Figure 8:
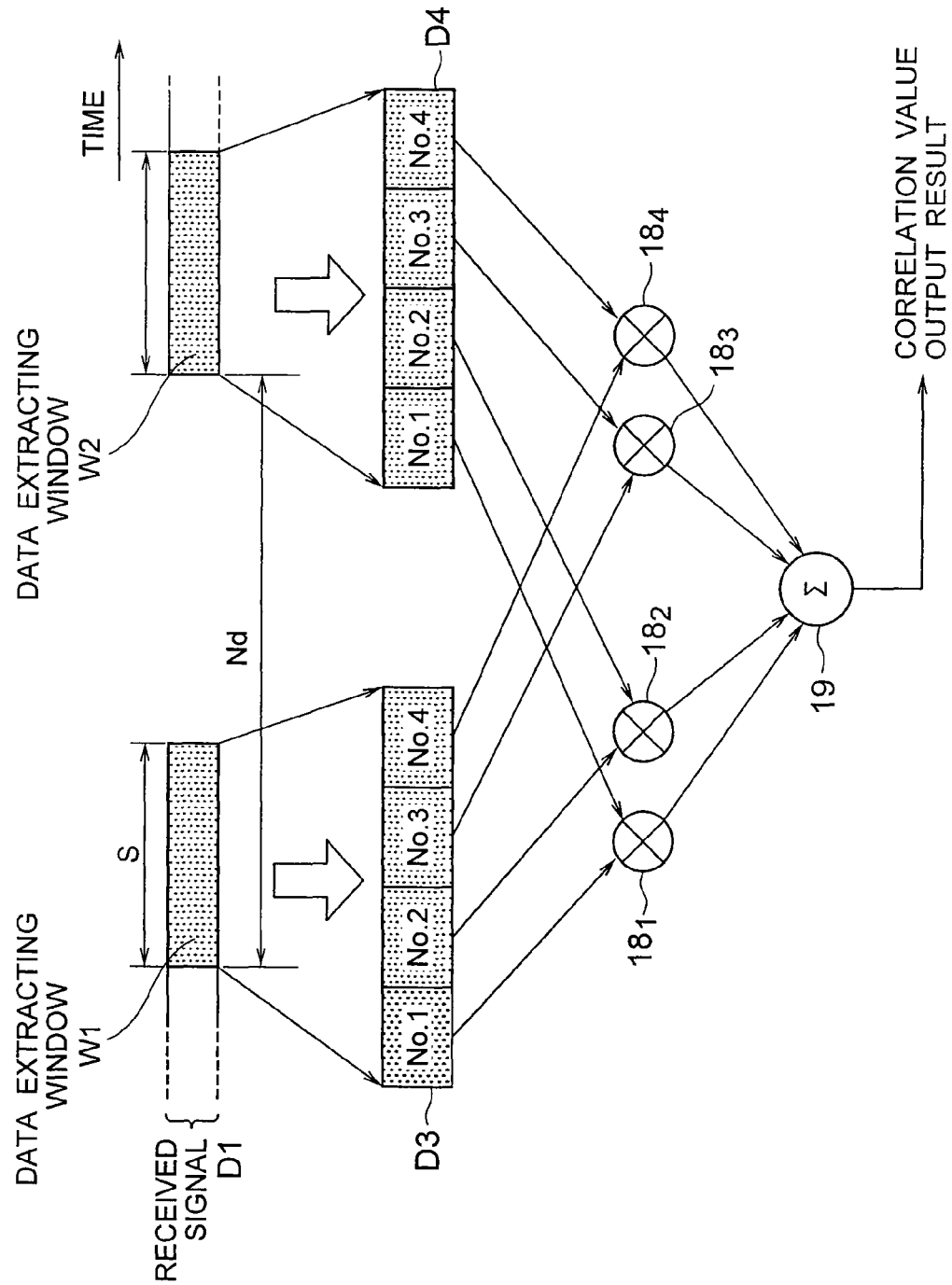
FIG. 8 is an illustration for describing the case where, in FIG. 4, the correlation processing is performed by using data extracting windows having three kinds of window sizes.

Next, the guard symbol length Ng will be determined by the window generating circuit 14 and data correlation circuit 15. The window generating circuit 14 obtains information regarding the OFDM data symbol length Nd which is detected by the Nd detecting circuit 13, and generates a pair of data extracting windows W1, W2 for correlation processing with a space therebetween that corresponds to the OFDM data symbol length Nd as shown in FIG. 8. As shown in FIG. 7A-FIG. 7B, the window generating circuit 14 has a function of generating the data extracting windows W1, W2 with different, but equal window sizes S. The window generating circuit 14 changes the sizes of the two data extracting windows W1 and W2 simultaneously.

The data correlation circuit 15 has a function of performing correlation processing by carrying out the sliding processing mutually on extracted data D3, D4(see FIG. 8) which are extracted through the data extracting windows W1, W2 by changing the window sizes S.

Next, a function of the data correlation circuit 15 will be described in detail by referring to the case where the window generating circuit 14 generates the data extracting windows W1, W2 with three kinds of window sizes S.

Upon receiving information on the data extracting windows W1, W2 generated from the window generating circuit 14, the data correlation circuit 15 performs sliding processing in the time axis direction with respect to the communication signal D1 by changing the sizes S of the data extracting windows W1, W2. By the sliding processing, the data correlation circuit 15 extracts a specific part of the data from the communication signal D1 through the data extracting windows W1, W2, and performs mutual correlation processing of the extracted data D3 and D4.

Figure 7C:
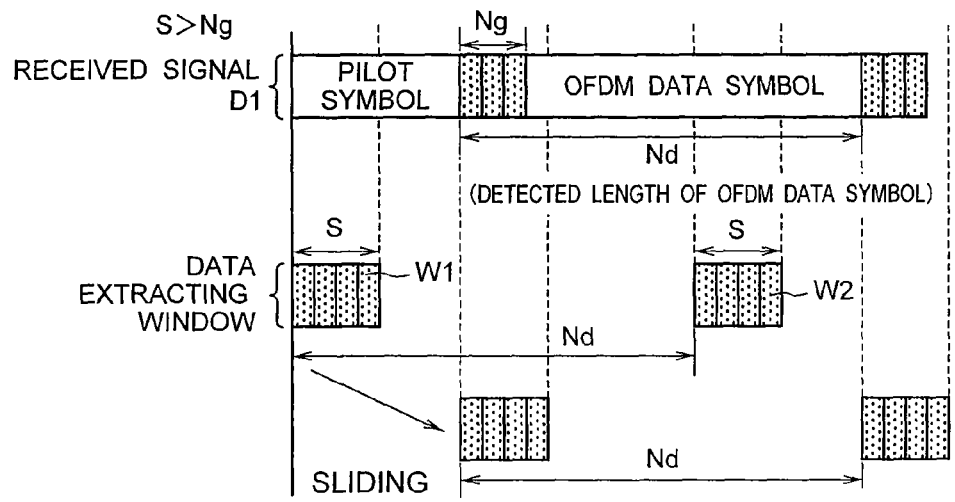
Figure 9:
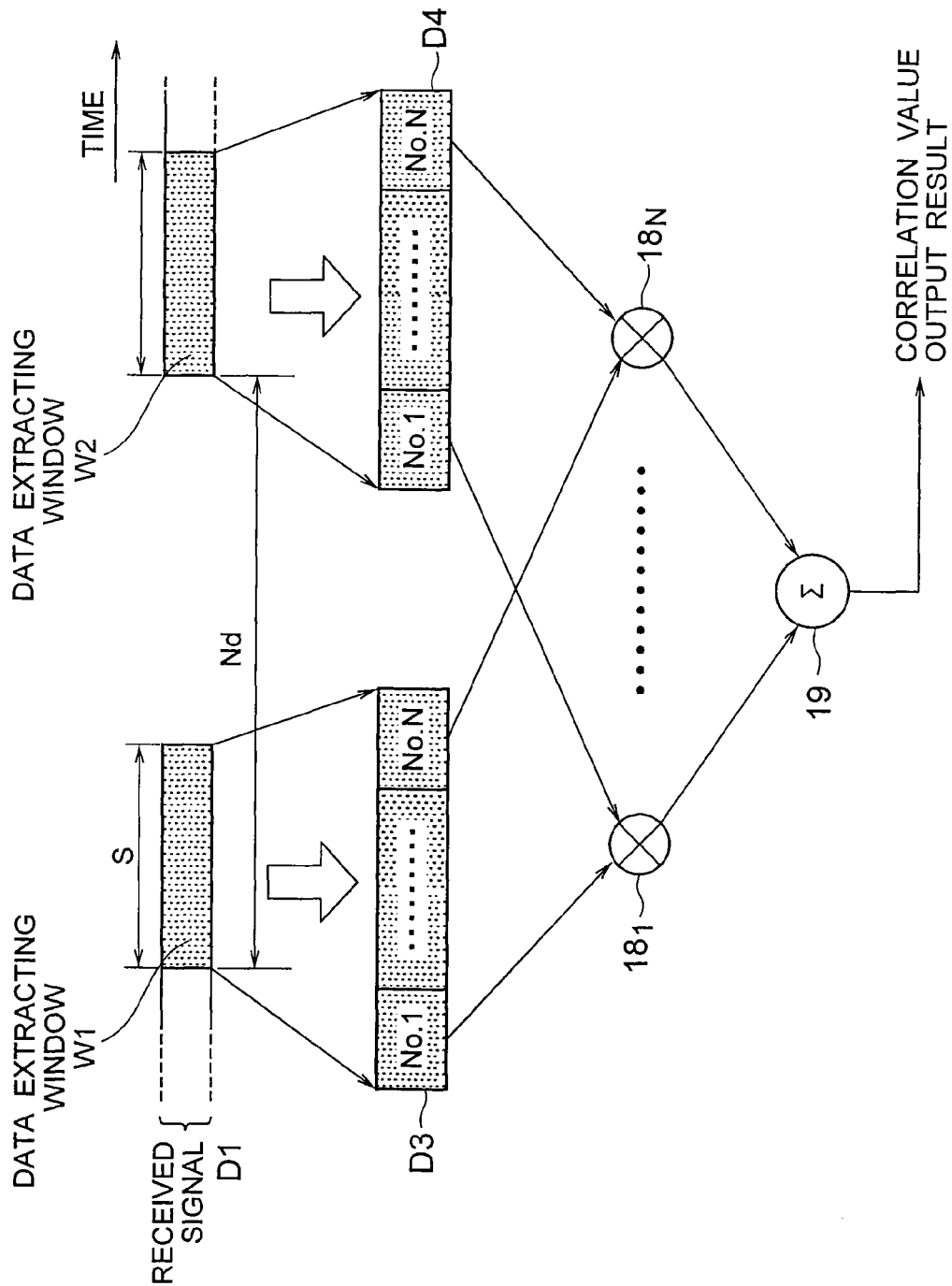
FIG. 9 is an illustration for describing the case where, in FIG. 4, the correlation processing is performed by using data extracting windows having N kinds of window sizes.

There is provided a specific description of the case where the data correlation circuit 15 performs mutual correlation processing on the extracted data D3 and D4 which are extracted through the data extracting windows W1, W2. The data correlation circuit 15 performs sliding processing on the data extracting windows W1, W2 with respect to the communication signal D1 as shown in FIG. 7A-FIG. 7C so as to extract a specific part of the data (data W3, W4) from the communication signal D1 as shown in FIG. 8. Then, the data correlation circuit 15 divides into four the extracted data D3, D4 which are extracted through the data extracting windows W1, W2 having a distance of the OFDM data symbol length Nd therebetween, and inputs the corresponding data to correlation devices $18_1$-$18_4$. That is, No. 1 data in one of the extracted data W3 and No. 1 data in the other extracted data W4 are inputted to the correlation device $18_1$, No. 2 data in the extracted data D3 and No. 2 data in the extracted data D4 to the correlation device $18_2$, No. 3 data in the extracted data D3 and No. 3 data in the extracted data D4 to the correlation device $18_3$, and No. 4 data in the extracted data D3 and No. 4 data in the extracted data D4 to the correlation device $18_4$, respectively, for performing the correlation processing on the data. Then, the data correlation circuit 15 inputs, to an adder 19, the information of the correlation result outputted from a plurality of the correlation devices $18_1$-$18_4$ for adding the output values thereof. The window sizes S generated by the window generating circuit 14 are not limited to three kinds, but may be variably set as appropriate. Further, for the correlation processing by the data correlation circuit 15, it is not limited to such a case where the data correlation circuit 15 performs the correlation processing on the extracted data D3, D4 by changing the three types of window sizes S. When there are N types of window sizes S, there is provided a structure in which correlation devices $18_1$-$18_n$ are combined with the adder 19 as shown in FIG. 9.

At first, the sizes S of the data extracting windows W1, W2 outputted from the window generating circuit 14 in the beginning are set as the initial values. First, described is the case where the initial sizes S of the data extracting windows W1, W2 are smaller than the guard interval symbol length Ng which is added to the front of the OFDM data symbol. In this case, as shown n FIG. 7A, the sizes S of the data extracting windows W1, W2 generated by the window generating circuit 14 are smaller than the guard interval symbol length Ng(S≦Ng). Thus, large correlation value peaks cannot be obtained when performing mutual correlation processing on the extracted data D3, D4 which are extracted through the data extracting windows W1, W2.

Next, there is described the case where the sizes S of the data extracting windows W1, W2 outputted by the window generating circuit 14 are consistent with the guard interval symbol length Ng which is added to the front of the OFDM data symbol. In this case, as shown in FIG. 7B, the sizes S of the data extracting windows W1, W2 generated by the window generating circuit 14 are consistent with the guard interval symbol length Ng (S=Ng). Thus, large correlation value peaks can be obtained when performing mutual correlation processing on the extracted data D3, D4 which are extracted through the data extracting windows W1, W2.

Subsequently, there is described the case where the sizes S of the data extracting windows W1, W2 outputted by the window generating circuit 14 are larger than the guard interval symbol length Ng which is added to the front of the OFDM data symbol. In this case, as shown in FIG. 7C, the sizes S of the data extracting windows W1, W2 generated by the window generating circuit 14 are larger than the guard interval symbol length Ng (S>Ng). Thus, large correlation value peaks can also be obtained when performing mutual correlation processing on the extracted data D3, D4 which are extracted through the data extracting windows W1, W2.

As shown in FIG. 8, the distance between the data extracting windows W1 and W2 is set as the length from the front of one of the data extracting window W1 to the front of the other data extracting window W2. Therefore, when the mutual correlation processing is performed on the data D3, D4 extracted through the data extracting windows W1, W2 with the sizes S which are the same or larger than the symbol length Ng (S=Ng, S>Ng), large correlation value peaks can be obtained, respectively.

As described above, based on the correlation processing outputted from the data correlation circuit 15, the Ng detecting circuit 16 detects the correlation value peaks which are obtained when the sizes S of the data extracting windows W1, W2 are consistent with the guard interval symbol length Ng.

Thereby, the guard interval symbol length Ng in the orthogonal frequency division multiplex signal is detected.

Figure 10A:
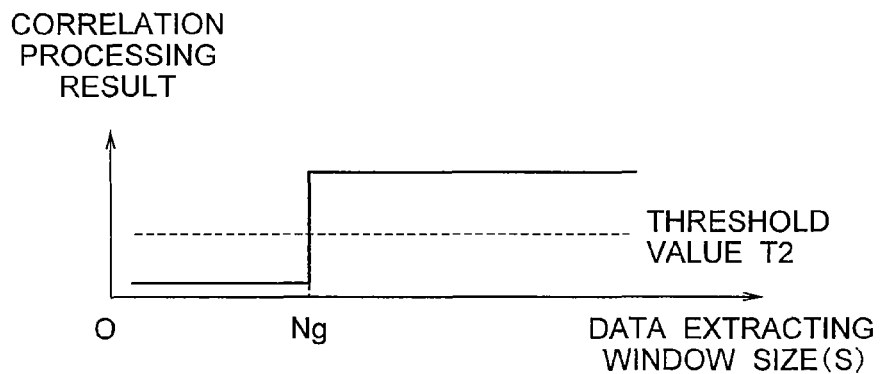
FIG. 10A is a characteristic diagram for showing a result of correlation processing using the data extracting windows of FIG. 7 as the parameter.

As shown in FIG. 10A, the correlation value peaks are not outputted before the sizes S of the data extracting windows W1, W2 become consistent with the guard interval symbol length Ng (S<Ng). Thus, the result of the correlation processing becomes smaller than a threshold value T2. When the sizes S of the data extracting windows W1, W2 become consistent with the guard interval symbol length Ng (S=Ng), large correlation value peaks can be observed and, in addition, the peak value exceeds the threshold value T2. Also, in the case where the sizes S of the data extracting windows W1, W2 are changed to the size larger than the guard interval symbol length Ng, the correlation value peaks exceeding the threshold value T2 are continuously observed.

Thus, as shown in FIG. 10A, the Ng detecting circuit 16 detects the correlation value based on the mutual correlation processing of the extracted data D3, D4 by using the threshold value T2 which can be set variably. Detection of the correlation value by setting the threshold value in this manner is advantageous in respect that it improves the accuracy of detecting the guard interval symbol length Ng.

The Np detecting circuit 17 has a function of detecting a pilot symbol length Np of the OFDM signal through obtaining periodicities of the correlation value peaks and the distance information between the adjacent correlation value peaks with different periodicities based on the correlation processing result of the data which are extracted through the data extracting windows W1, W2 with the different window sizes S, on condition that the space between the pair of the data extracting windows W1, W2 is the detected OFDM data symbol length Nd.

The function of the Np detecting circuit 17 will be described in detail. The Np detecting circuit 17 performs detecting processing by paying attention to the result of the correlation processing performed when the sizes of the data extracting windows W1, W2 are consistent with the guard interval symbol length Ng obtained by the Ng detecting circuit 16. On condition that the sizes of the data extracting windows W1, W2 are consistent with the guard interval symbol length Ng, there are two periodicities generated in the correlation value peaks as shown in FIG. 10B.

Figure 10B:
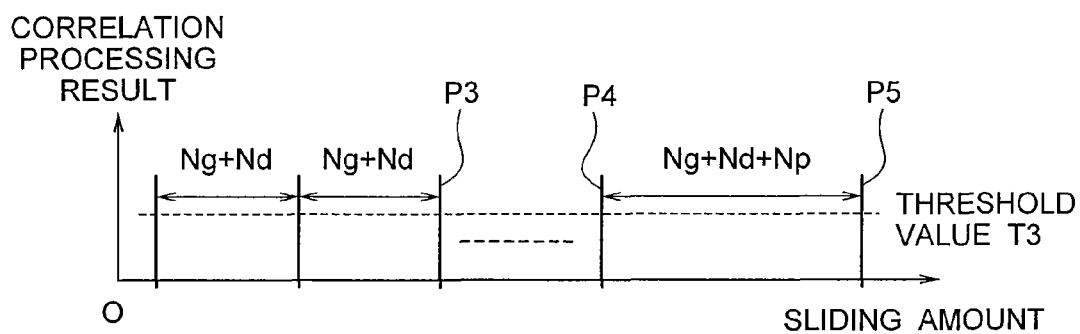
FIG. 10B is a characteristic diagram for showing the periodicity of the correlation peaks when the window size of FIG. 7 is consistent with the length of the guard interval symbol.

Regarding the two periodicities, as shown in FIG. 10B, one of the periods has the length between the adjacent correlation value peaks P2 and P3, which is a period (Ng+Nd) consistent with the sum of the guard interval symbol length Ng and the OFDM data symbol length Nd. As shown in FIG. 10B, the other period has the length between the adjacent correlation value peaks P4 and P5, which is a period consistent with the sum of the guard interval symbol length Ng, the OFDM data symbol length Nd, and the pilot symbol length Np (Ng+Nd+Np). The reason for including the pilot symbol length Np is as follows. It is because the correlation value peak P4 appears by corresponding to the position of the guard interval symbol that follows the pilot symbol positioned at the end of the OFDM signal frame shown in FIG. 1A, when the sizes S of the data extracting windows W1, W2 are larger than the guard interval symbol length Ng.

The Np detecting circuit 17 detects the above-described two periodicities by obtaining the information regarding the sizes S of the data extracting windows W1, W2 generated by the window generating circuit 14 (i.e. the size information indicating that the sizes S of the data extracting windows W1, W2 are consistent with the guard interval symbol length Ng, and the size information indicating that the sizes S of the data extracting windows W1, W2 exceed the guard interval symbol length Ng) and the information on the correlation value peaks which are obtained when the data extracting windows W1, W2 and the guard interval symbol length Ng are consistent.

That is, the Np detecting circuit 17 detects the periodicity having the length of Ng+Nd based on the size information indicating that the sizes S of the data extracting windows W1, W2 are consistent with the guard interval symbol length Ng, and the information of the correlation value peaks which are obtained when the data extracting windows W1, W2 and the guard interval symbol length Ng are consistent. Further, the Np detecting circuit 17 detects the periodicity having the length of Ng+Nd+Np based on the size information indicating that the sizes S of the data extracting windows W1, W2 exceed the guard interval symbol length Ng, and the information of the correlation value peaks which are obtained when the data extracting windows W1, W2 and the guard interval symbol length Ng are consistent.

Figure 10C:
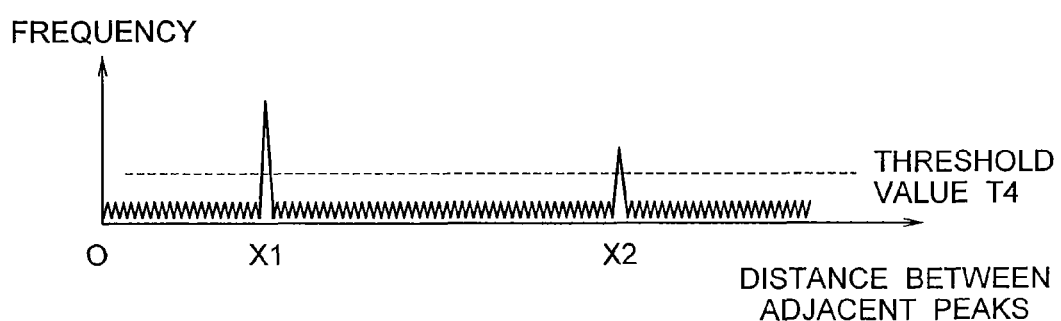
FIG. 10C is a characteristic diagram for showing a frequency histogram of the correlation peak period which is obtained by the correlation peak processing of FIG. 4.

Furthermore, as shown in FIG. 10B, by using a threshold value T3 which can be set variably for the correlation value peaks P3, P4, P5 in the two detected periodicities, the Np detecting circuit 17 detects the correlation value peaks P3, P4, P5 whose values exceed the threshold value T3. Among the detected correlation value peaks, the Np detecting circuit 17 forms a frequency histogram based on the distance (sliding amount) between the adjacent correlation value peaks P4, P5 which exceed a threshold value 4. FIG. 10C shows an example of the frequency histogram.

In FIG. 10C, a first correlation value peak X1 corresponds to the correlation value peak P4 (FIG. 10B) which is generated in the period of Ng+Nd, while a second correlation value peak X2 corresponds to the correlation value peak P5 (FIG. 10C) which is generated in the period of Ng+Nd+Np.

The Np detecting circuit 17 measures the sliding amount from the correlation value peak 3 in the period of Ng+Nd as the reference to the correlation value peak P4 and the sliding amount from the reference to the correlation value peak P5 so as to obtain the distance information between the correlation value peaks P3 and P4 which have different periodicities. The distance information between the adjacent correlation value peaks P3 and P4 corresponds to the second correlation value peak X2, which corresponds to the length of the period Ng+Nd+Np.

After obtaining the above-described distance information, the Np detecting circuit 17 detects the pilot symbol length Np from the following expression (1) by using the distance information, the guard interval symbol length Ng and the OFDM data symbol length Nd which have been detected so far among the parameters of the OFDM signal.

$$Np = X2 - (Ng + Nd) \tag{1}$$

As described above, the detection unit detects the data symbol length, the guard interval symbol length, and the pilot symbol length when the communication signal D1 is the OFDM signal.

Now, there is considered the unknown communication signal D1. The unknown communication signal D1 include the OFDM signal shown in FIG. 12A, the digital modulation signal shown in FIG. 12B, and the analog modulation signal shown in FIG. 12C. Considering the characteristics of those signals, the OFDM signal shown in FIG. 12A has the pilot symbol P added to the front, and the guard interval symbol G added to the front of the data symbol T that follows the pilot symbol P. The pilot symbol P is added again after a series of a required number of data symbols T and, in the same manner, the data symbols T having the guard interval symbol G are continued to form the signal structure.

Meanwhile, the digital modulation signal shown in FIG. 12B is formed in a structure in which the pilot symbol P is added to the front, a specific length of data symbols T are continued thereafter, and the pilot symbol P is added again. For the internal structure of the data symbol T of the digital modulation signal, the data is not arranged in an orderly manner unlike the case of the OFDM signal, but arranged randomly.

Further, the analog modulation signal shown in FIG. 12 C has no pilot symbol P or the guard interval symbol G provided therein, and it is formed only with the data symbol T of a specific length.

When the correlation signal generating circuit 11 generates the duplicate signals D2 of those communication signals D1, and the autocorrelation processing circuit 12 performs autocorrelation processing by carrying out sliding processing on the duplicate signals D2 of the communication signals D1, there are obtained the correlation results as shown in FIG. 12D, FIG. 12E, and FIG. 12F.

That is, in the case of the OFDM signal, correlation peak values P0 appear at the positions of the pilot symbols P, and correlation peak values G0 appear at the positions of the guard interval symbols G as shown in FIG. 12D. In the case of the digital modulation signal, as shown in FIG. 12E, correlation peak values P0 appear at the positions of the pilot symbols P. Since it has no guard interval symbol, there are only the correlation peak values P0 appeared therein. In the case of the analog modulation signal, neither correlation value peak appears as shown in FIG. 12F. As can be seen from the signal structures shown in FIG. 12A-FIG. 12C, the OFDM signal and the digital modulation signal have a common feature in respect that both have the pilot symbol P, and have a difference in respect that the digital modulation signal has no guard interval symbol G as shown in FIG. 13. Further, the analog modulation signal is different from the OFDM signal and the digital modulation signal in respect that it has neither the pilot symbol P nor the guard interval symbol G.

The identifying circuit 18 has a function of identifying the modulation mode of the unknown communication signal D1, having the information regarding the pilot symbol P and the guard interval symbol G of the communication signal D1 outputted from the detection unit as the input. Specifically, when a signal with the waveform of FIG. 12D is inputted from the detection unit, the identifying circuit 18 identifies the unknown communication signal as the OFDM signal. When a signal with the waveform of FIG. 12E is inputted from the detection unit, the identifying circuit 18 identifies the unknown communication signal as the digital modulation signal. When a signal with the waveform of FIG. 12F is inputted from the detection unit, the identifying circuit 18 identifies the unknown communication signal as the analog modulation signal.

In the embodiment, the identifying circuit 18 has been described by referring to the case where it is provided only with the identifying function of the modulation mode for the OFDM signal, the digital modulation signal, and the analog modulation signal. However, it is not limited to that. A function of detecting the number M of the data symbols per frame of the OFDM signal may be added to the identifying circuit 18. Specifically, the identifying circuit 18 may be provided with a function of detecting the number M of the data symbols per frame of the orthogonal frequency division multiplex signal by attaining the frame length L of the orthogonal frequency division multiplex signal based on the detected data symbol length Nd and the guard interval symbol length Ng, and referring to the communication parameters of each of the attained symbol lengths Ng, Nd, Np.

Among the parameters of the OFDM signals, the pilot symbol length Np, the guard interval symbol length Ng, and the OFDM data symbol length Nd are detected through the processing described above. As can be seen from FIG. 11, the frame length L of the OFDM signal corresponds to the length from the correlation value peak P1 which is generated in the short period Ng+Nd to the correlation value peak P5 which is generated in the long period Nd+Ng+Np. Thus, the frame length L of the OFDM signal is calculated from the relation shown in FIG. 11.

A specific explanation will be provided hereinafter. By referring to FIG. 1A, it has been described that the length from the pilot symbol PS1 at the front to the pilot symbol PS2 at the end is the frame length of the OFDM signal. However, in the embodiment, the length from the guard interval symbol G1 following the front pilot symbol PS1 to the pilot symbol PS2 at the end is set as the frame length L of the OFDM signal because of the sliding processing. The frame lengths L of the OFDM signal in FIG. 1A and FIG. 11 are the same due to the frame structure of the OFDM signals.

The correlation processing is performed in the embodiment of the present invention by carrying out the sliding processing, so that the correlation value peak P1 is detected at the front position of the guard interval symbol G1 and, thereafter, the correlation value peaks are detected at the positions of the following guard interval symbols G2, G3 and at the position of the guard interval G4 following the pilot symbol PS2 at the end, respectively. In the case shown in FIG. 11, the length between the correlation value peak P1 at the front and the correlation value peak P5 at the end corresponds to the frame length L of the OFDM signal. That is, the M detecting circuit 18 calculates the frame length L of the OFDM signal based on the sliding amount between the correlation value peaks P1 and P3, the sliding amount between the correlation peak values P3 and P4, and the sliding amount between the correlation value peaks P4 and P5. Then, the M detecting circuit 18 detects the number M of the data symbols per frame based on the information on the frame length L.

The frame length L of the OFDM signal can be expressed by the following expression (2) where the number of the data symbols per frame of the OFDM signal is M.

$$L=M(Ng+Nd)+Np \qquad (2)$$

From the expression (2), the number M of the data symbols per frame of the OFDM signal can be expressed as follows.

$$M=(L-Np)/(Ng+Nd) \qquad (3)$$

As described above, the frame length L of the OFDM signal has been detected. Thus, the number M of the data symbols per frame of the OFDM signal is calculated from the expression (3).

Next, described is a method for identifying the modulation mode of the received unknown communication signal D1 using a modulation mode identifying apparatus 10 according to the embodiment of the present invention.

As shown in FIG. 12, the unknown communication signals D1 include the OFDM signal having both the pilot symbol P and the guard interval symbol G, the digital modulation signal having only the pilot symbol P, and the analog modulation signal having neither symbol. The reception side receives those unknown communication signals D1 without having known information of the signals. There will be provided an explanation of detecting the pilot symbol P and the guard interval symbol G contained in the communication signals D1 by specifically referring to the case of the OFDM signal with a complicated signal structure among the unknown communication signals D1.

As shown in FIG. 1A, in the OFDM signal, there are pilot symbols arranged at the front and the end in the time axis direction, and a plurality of sets of guard interval symbols and OFDM data symbols are arranged between the pilot symbols. At the front of the OFDM data symbol which is shown in FIG. 1A, the guard interval symbol that is a copy of a part of the OFDM data symbol as the transmission data is added as shown in FIG. 1B. The above-described guard interval symbol protects the orthogonal characteristic of the transmission signal from the influence of multi-carriers. At the same time, it is a signal structure peculiar to the OFDM signal which is used for synchronizing when performing demodulation processing on the orthogonal frequency division multiplex signal.

For detecting each of the signal parameters of the OFDM signals, the embodiment of the present invention utilizes the periodicity of the guard interval symbol so as to detect the data length Nd of the OFDM data symbol of the OFDM signal, and detects other parameters based on the detected data length Nd of the OFDM data symbol. In the followings, it will be described in detail.

Figure 4:
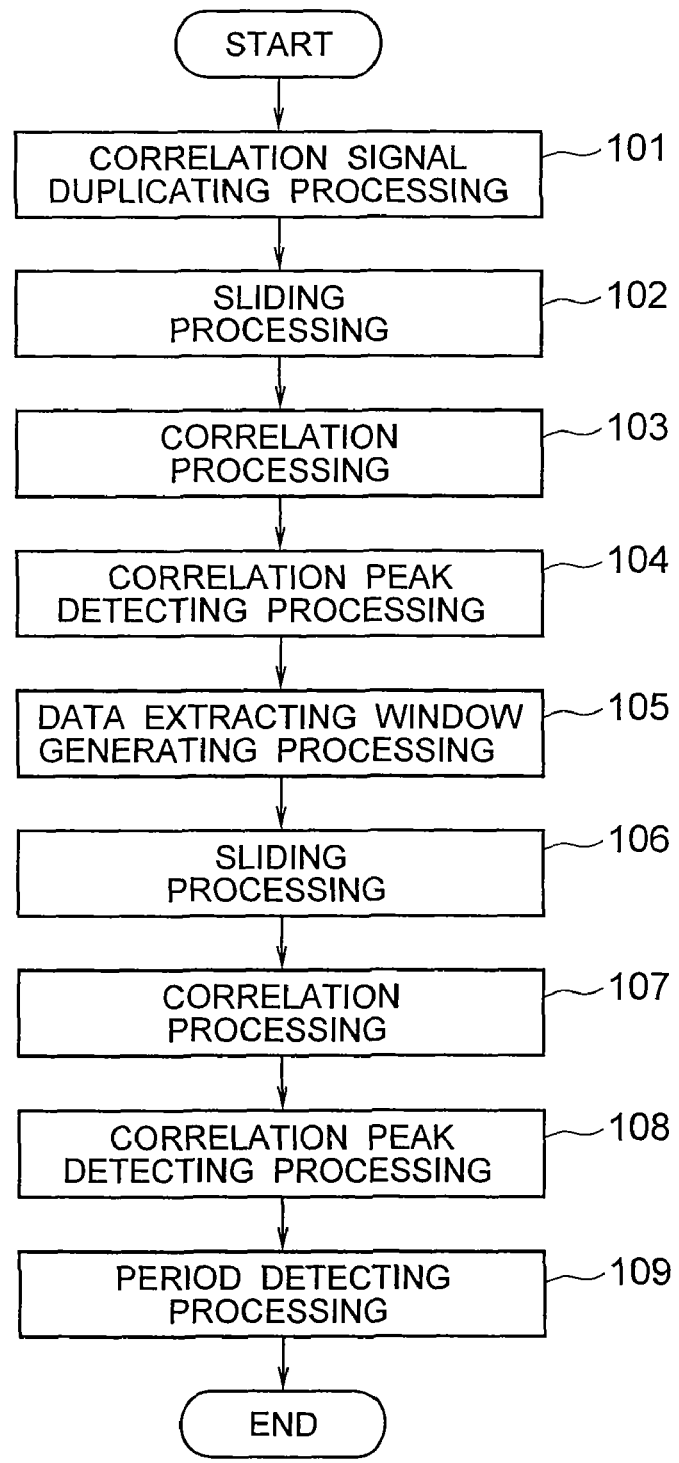
FIG. 4 is a flowchart for showing operation of the modulation mode identifying apparatus of the orthogonal frequency division multiplex signal shown in FIG. 1.

In FIG. 4, processing is performed at first on the received OFDM signal for detecting the data length Nd of the OFDM data symbol (steps 101-104). Then, processing is performed for detecting the pilot symbol length Np, the guard interval symbol length Ng, and the number M of the data symbols (steps 105-109) based on the obtained OFDM data symbol length Nd.

First, described is the processing performed for detecting the OFDM data symbol length Nd (steps 101-104). Upon receiving the OFDM signal, the correlation signal duplicating circuit 11 duplicates the correlation signal from the received OFDM signal (step S101). Specifically, the correlation signal duplicating circuit 11 copies the received OFDM signal and produces the copied OFDM signal as the correlation signal.

Upon receiving the correlation duplicate signal which has been duplicated, the autocorrelation circuit 12, as shown in FIG. 5, performs sliding processing on the duplicate signal in the time base direction with respect to the received signal D1 that is the OFDM signal (step 102).

As shown in FIG. 5 a), the autocorrelation circuit 12 performs the sliding processing by setting the sliding amount N as 0 for performing the correlation processing on the duplicate signal D2 with the sliding amount N=0 and the communication signal D1 (step 103), and outputs the correlation-processed data to the Nd detecting circuit 13. The Nd detecting circuit 13 receives the result of the correlation processing from the autocorrelation circuit 12 and detects the correlation value peaks of the communication signal D1 and the correlation signal D2 (step 104). In this case, the sliding amount N is set as 0. Thus, as shown in FIG. 5a), the communication signal D1 and the correlation signal D2 are completely consistent with each other so that large correlation value peaks can be obtained.

In the step 102, the autocorrelation circuit 12 performs the sliding processing by variably setting the sliding amount N from 0 as the initial value to N<Nd, N=Nd, and N>Nd. In the step 103, the autocorrelation circuit 12 performs the correlation processing one after another on the correlation signal D2 and the communication signal D1 under the state where the sliding amount N is variably set as N<Nd, N=Nd, and N>Nd as in FIG. 5b), c), d). In the step 104, the Nd detecting circuit 13 calculates the correlation value of the communication signal D1 and the correlation signal D2. As a characteristic of the OFDM signal, as shown in FIG. 1A and FIG. 1B, a signal which is a copy of a part of the OFDM data symbol is added to the front of the OFDM data symbol as the guard interval symbol. Therefore, as the result of the correlation processing performed between the guard interval symbols, the correlation value having a large peak can be obtained.

It will be described more specifically. When the sliding amount is N<Nd as shown in FIG. 5b), it is the correlation processing for non-correlation signal. Thus, there is no peak of the correlation value detected by the correlation processing performed on the communication signal D1 and the correlation signal D2. When the sliding amount N is N=Nd as shown in FIG. 5c), it is the correlation processing between the guard interval symbols. Thus, a correlation value with a large peak is detected as the correlation value peak obtained by the correlation processing performed on the communication signal D1 and the correlation signal D2. When the sliding amount is N>Nd as shown in FIG. 5d), it again becomes the correlation processing for non-correlation signal. Thus, there is no peak of the correlation value detected by the correlation processing performed on the communication signal D1 and the correlation signal D2.

As described above, the autocorrelation circuit 12 performs the sliding processing by variably setting the sliding amount N (N=0, N<Nd, N>Nd) in order and performs the correlation processing on the communication signal D1 and the correlation signal D2 with the variably set sliding amount. When the Nd detecting circuit 13 receives the correlation-processed data and detects the correlation value peaks of the received signal D1 and the correlation signals D2, there are detected the correlation value peaks when the sliding amount N is 0 and when the sliding amount N is Nd as shown in FIG. 6.

As can be seen from FIG. 6, the distance between the peak of the correlation value where the sliding amount N is 0 and the peak where the sliding amount N is Nd corresponds to the OFDM data symbol length Nd of FIG. 1A. That is, the sliding amount between the correlation peaks where the correlation value shows large peaks is consistent with the OFDM data symbol length Nd. Thus, the Nd detecting circuit 13 detects the sliding amount between the above-described correlation peaks as the OFDM data symbol length Nd. In FIG. 6, the horizontal axis is the sliding amount N, and the vertical axis is the correlation value peak that is obtained as a result of the correlation processing. FIG. 6 shows changes in the correlation value peaks as a result of the correlation processing when the sliding amount is taken as a parameter.

By the processing described above, it is possible with the embodiment of the present invention to detect the OFDM data symbol length Nd from the OFDM signal with no known information.

Next, described is the processing performed for detecting the guard interval symbol length Ng based on the obtained OFDM data symbol length Nd.

In the step 105, the window generating circuit 14 obtains the information on the OFDM data symbol length Nd which is detected by the Nd detecting circuit 13, and generates a pair of data extracting windows W1, W2 for correlation processing having, therebetween, a distance which corresponds to the OFDM data symbol length Nd as shown in FIG. 8 (data extracting window generating processing).

In the step 106, upon receiving information on the generated data extracting windows W1, W2 from the window generating circuit 14, the data correlation circuit 15 performs sliding processing in the time base direction with respect to the received signal D1 by changing the sizes S of the data extracting windows W1, W2. In the step 107, by the sliding processing, the data correlation circuit 15 extracts a specific part of the data from the received signal D1 through the data extracting windows W1, W2, and performs mutual correlation processing on the extracted data D3 and D4.

In the step 108, based on the correlation processing outputted from the data correlation circuit 15, the Ng detecting circuit 16 detects the correlation value peak which is obtained when the sizes S of the data extracting windows W1, W2 are consistent with the guard interval symbol length Ng. Thereby, the guard interval symbol length Ng in the orthogonal frequency division multiplex signal is detected.

In the step 109, the Np detecting circuit 17 detects the correlation value peak which is equal to or larger than the threshold value based on the correlation processing of the data W3, W4 extracted through the data extracting windows W1, W2, on condition that the distance between the data extracting windows W1 and W2 is the detected OFDM data symbol length Nd. Thereby, the pilot symbol length Np is detected.

That is, the Np detecting circuit 17 detects the pilot symbol length Np with the following expression (1) by using the guide interval length Ng and the OFDM data symbol length Nd which have been detected so far among the parameters of the OFDM signal.

$$Np=X2-(Ng+Nd) \quad (1)$$

In the step 109, the M detecting circuit 18 detects the frame length L of the orthogonal frequency division multiplex signal based on the data symbol length Nd, the guard interval symbol length Ng, and the pilot symbol length Np which have been detected so far, and detects the number M of the data symbols per frame of the orthogonal frequency division multiplex signal by referring to the obtained communication parameters.

Specifically, among the parameters of the OFDM signals, the pilot symbol length Np, the guard interval symbol length Ng, and the OFDM data symbol length Nd are detected through the processing described above. As can be seen from FIG. 11, the frame length L of the OFDM signal corresponds to the length from the correlation value peak which is detected in the short period Ng+Nd to the correlation value peak which is detected in the long period Nd+Ng+Np. Thus, the frame length L of the OFDM signal is calculated from the relation shown in FIG. 11.

The frame length L of the OFDM signal can be expressed by the following expression (2) where the number of the data symbols per frame of the OFDM signal is M.

$$L=M(Ng+Nd)+Np \quad (2)$$

From the expression (2), the number M of the data symbols per frame of the OFDM signal can be expressed as follows.

$$M=(L-Np)/(Ng+Nd) \quad (3)$$

As described above, the frame length L of the OFDM signal has been detected. Thus, the detecting circuit 18 calculates the number M of the data symbols per frame of the OFDM signal from the expression (3).

As described above, in the embodiment of the present invention, the data length Nd of the OFDM data symbol of the received OFDM signal is detected through performing the correlation processing by utilizing the periodicity of the guard interval symbol. Further, the guard interval symbol length Ng is detected based on the OFDM data symbol length Nd by detecting the correlation value through performing the sliding processing using the data extracting windows whose window sizes can be varied. Furthermore, based on the guard interval symbol length Ng, two specific periodicities are calculated from the result of the correlation value against the sliding amount so as to detect the pilot symbol length Np and the multiplex number M of the OFDM data symbols per frame of the OFDM signal.

As evident from the above-described steps, in the case of the OFDM signal, correlation peak values P0 appear at the positions of the pilot symbols P, and correlation peak value G0 appear at the positions of the guard interval symbols G as shown in FIG. 12D. In the case of the digital modulation signal, correlation peak values P0 appear at the positions of the pilot symbols P as shown in FIG. 12E. Since it has no guard interval symbol, there are only the correlation peak values P0 appeared therein. In the case of the analog modulation signal, neither correlation value peak appears as shown in FIG. 12F. As can be seen from the signal structures shown in FIG. 12A-FIG. 12C, the OFDM signal and the digital modulation signal have a common feature in respect that both have the pilot symbols P, and have a difference in respect that the digital modulation signal has no guard interval symbol G. Further, the analog modulation signal is different from the OFDM signal and the digital modulation signal in respect that it has neither the pilot symbol P nor the guard interval symbol G.

The identifying circuit 18 has a function of identifying the modulation mode of the unknown communication signal D1, having the information regarding the pilot symbol P and the guard interval symbol G of the communication signal D1 outputted from the detection unit as the input. Specifically, when a signal with the waveform of FIG. 12D is inputted from the detection unit, the identifying circuit 18 identifies the unknown communication signal as the OFDM signal. When a signal with the waveform of FIG. 12E is inputted from the detection unit, the identifying circuit 18 identifies the unknown communication signal as the digital modulation signal. When a signal with the waveform of FIG. 12F is inputted from the detection unit, the identifying circuit 18 identifies the unknown communication signal as the analog modulation signal.

In the description provided above, as shown in FIG. 1 and FIG. 1B, there is described the case of detecting the communication parameter from the multiplex modulation signal which has the signal structure wherein the signal that is a copy of a part of the data symbol is added to the front of the data symbol as the guard interval symbol, and the pilot symbol is added in front of the guard interval symbol. However, it is not limited to that.

That is, in the case of the multiplex modulation signal with the signal structure wherein the signal that is a copy of a part of the data symbol is added to the front of the data symbol as the guard interval symbol, the pilot symbol may be inserted within the data symbol. In that case, the pilot symbol cannot function as the pilot signal. In that circumstance, processing may simply be performed to detect, as the communication parameters, only the data symbol length Nd and the guard interval symbol length Ng of the multiplex modulation signal.

Further, the modulation mode identifying apparatus according to the embodiment of the present invention is built as a hardware apparatus as shown in FIG. 3. However, the functions of the modulation mode identifying apparatus of FIG. 3, which performs the processing shown in FIG. 4, maybe executed by a computer as well. In that case, a communication parameter detection program to be installed in a computer is built with a following structure.

That is, it is built as a modulation mode identifying program for a computer, which constitutes a modulation mode identifying apparatus for identifying a modulation mode of an unknown communication signal, to execute: a function of generating a duplicate signal for correlation processing based on an unknown communication signal; a function of performing autocorrelation processing through carrying out sliding processing on the duplicate signal with respect to the unknown communication signal; a function of detecting information regarding a pilot symbol and a guide interval symbol of the communication signal based on a correlation value output obtained by the autocorrelation processing; and a function of identifying a modulation mode of the unknown communication signal based on the information regarding the pilot symbol and the guide interval symbol of the communication signal.

Further, the program allows the computer to execute a function of identifying the orthogonal frequency division multiplex signal, a digital modulation signal, and an analog modulation signal based on the information regarding the pilot symbol. Furthermore, it allows the computer to execute a function of identifying the orthogonal frequency division multiplex signal and a digital modulation signal based on the information regarding the guard interval symbol.

Second Embodiment

Figure 14:
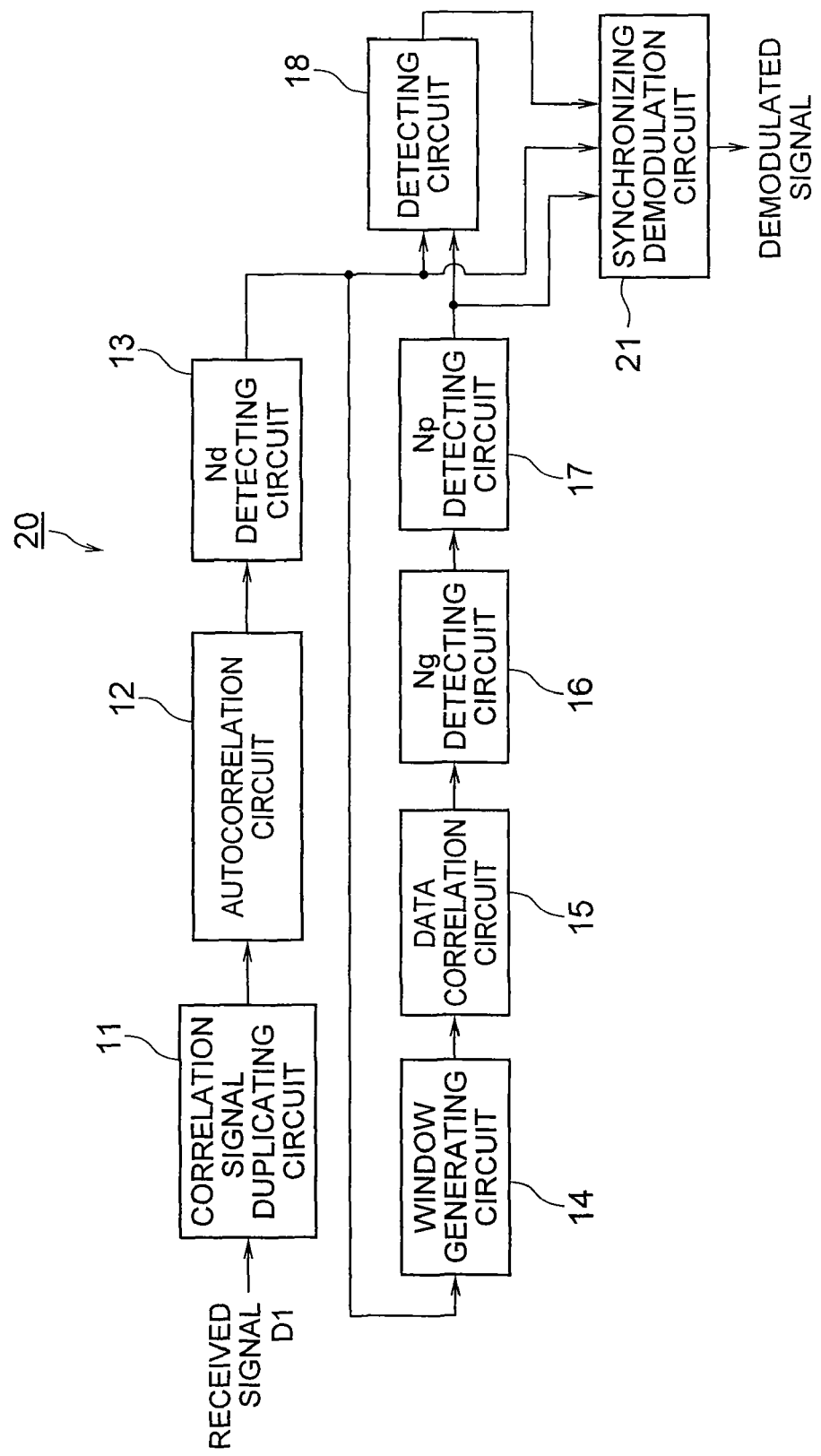
FIG. 14 is a functional block diagram for showing a synchronizing demodulation apparatus for the orthogonal frequency division multiplex signal according to the embodiment of the present invention.
Figure 15:
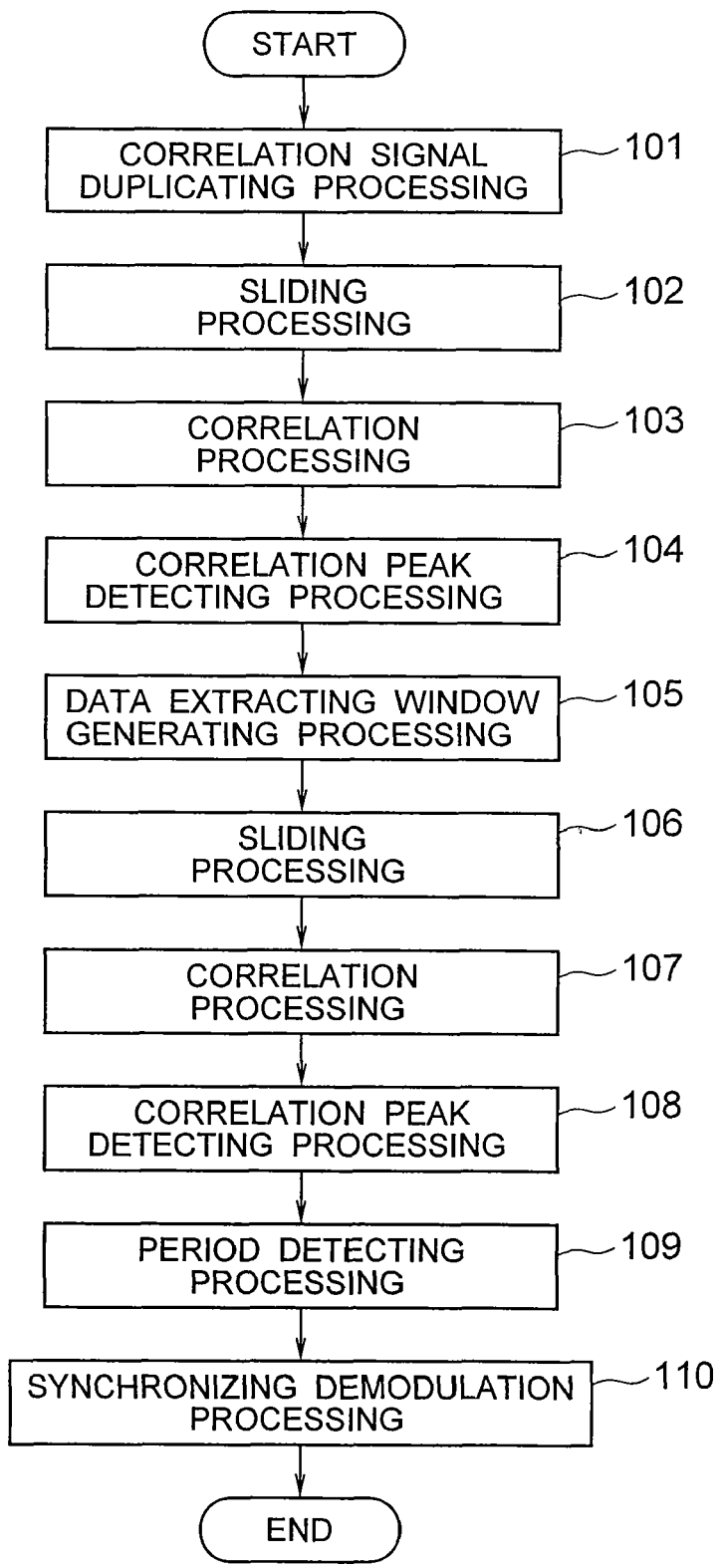
FIG. 15 is a flowchart for showing operation of the synchronizing demodulation apparatus for the orthogonal frequency division multiplex signal shown in FIG. 14.

FIG. 14 and FIG. 15 show an embodiment of an OFDM signal synchronizing demodulation apparatus according to the present invention. FIG. 14 is a functional block diagram and FIG. 15 is a flowchart for showing the operation. There is provided a description hereinafter by referring to the drawings. However, descriptions of the same components as those of FIG. 3 and FIG. 4 will be omitted by simply applying the same reference numerals thereto.

A synchronizing demodulation apparatus 20 for the orthogonal frequency division multiplex signal according to the embodiment of the present invention is obtained by adding, to the modulation mode identifying apparatus 10 of the orthogonal frequency division multiplex signal shown in FIG. 3, a synchronizing demodulation circuit 21 which achieves synchronizing demodulation processing of the received signals based on the OFDM parameters of the signals obtained by the modulation mode identifying apparatus 10. The synchronizing demodulation circuit 21 itself is the same as that of the conventional case. However, the OFDM parameters used herein are not the known information, but obtained by the modulation mode identifying apparatus 10 shown in FIG. 3. In other words, use of the detected result obtained by the modulation mode identifying apparatus 10 enables the demodulation processing to be performed on the received OFDM signal with unknown parameters.

As shown in FIG. 14, the synchronizing demodulation apparatus 20 for the orthogonal frequency division multiplex signal according to the embodiment of the present invention is built to comprise, as a fundamental structure: a correlation signal generating circuit 11 which generates a duplicate signal for correlation processing based on the orthogonal frequency division multiplex signal; an autocorrelation circuit 12 which performs autocorrelation processing through carrying out sliding processing on the duplicate signal with respect to a received signal as the orthogonal frequency division multiplex signal; an Nd detecting circuit 13 which detects the data symbol length of the orthogonal frequency division multiplex signal by detecting, from a correlation value output which is outputted by the autocorrelation processing, correlation value peaks obtained according to the guard intervals which are the same signal components present in the received signals; a window generating circuit 14 for generating a pair of data extracting windows for correlation processing, in which the windows have different window sizes and have a space therebetween that corresponds to the detected data length of the data symbol; a data correlation circuit 15 which performs correlation processing performed mutually on extracted data which are extracted through the data extracting windows through the sliding processing by changing the window sizes; an Ng detecting circuit 16 which detects the guard interval symbol length of the orthogonal frequency division multiplex signal by detecting correlation value peaks which are obtained when the data length of the guard interval symbol and the window sizes become consistent based on the correlation processing performed mutually on the extracted data; an Np detecting circuit 17 which detects the pilot symbol length of the multiplex modulation signal by obtaining periodicities of the correlation value peaks based on a result of the correlation processing of data which are extracted through the data extracting windows of different sizes and distance information of the adjacent correlation value peaks with different periodicities, on condition that the space between the pair of data extracting windows is the data symbol length; an M detecting circuit 18 which detects a number of data symbols of the multiplex modulation signal per frame by obtaining the frame length of the multiplex modulation signal based on the data symbol length, the guard interval symbol length , and the pilot symbol length which have been detected, and by referring to each of the data lengths as the communication parameters; and the synchronizing demodulation circuit 21 which performs synchronizing demodulation on the orthogonal frequency division multiplex signal according to the obtained communication parameters.

Needless to say, the present invention is not limited to each of the above-described embodiments. For example, modifications such as distributions of the functions through separating or combining each function, changing the orders of each procedure, etc. can be done at will as long as the above-described functions can be achieved.

As described above, the present invention is capable of identifying the OFDM signal, the digital modulation signal, and the analog modulation signal by performing blind processing without having information in advance, through detecting the characteristics of the unknown communication signals, such as the pilot symbol and the guard interval symbol.

What is claimed is:

1. A modulation mode identifying apparatus, comprising:
    a correlation signal generating circuit which generates a duplicate signal for correlation processing based on an unknown communication signal;
    an autocorrelation circuit which performs autocorrelation processing through carrying out sliding processing on the duplicate signal with respect to the unknown communication signal;
    a detection unit which detects information regarding a pilot symbol and a guide interval symbol of the communication signal based on a correlation value output obtained by the autocorrelation processing, comprising:
    an Nd calculating circuit for calculating a data symbol length of an orthogonal frequency division multiplex signal by detecting, from the correlation value output obtained by the autocorrelation processing, correlation value peaks that are obtained based on the pilot symbol and the guard interval symbol present within the communication signal;
    a window generating circuit for generating a pair of data extracting windows for correlation processing, the windows having different window sizes and having a space therebetween which corresponds to the detected data symbol length;

a data correlation circuit for performing correlation processing mutually on extracted data which are extracted through the data extracting windows with the sliding processing by changing the window sizes;

an Ng calculating circuit for calculating the guard interval symbol length of the orthogonal frequency division multiplex signal by detecting a correlation value peak which is obtained when the guard interval symbol length and the window size become consistent based on the correlation processing performed mutually on the extracted data; and an Np calculating circuit for calculating a pilot symbol length of the orthogonal frequency division multiplex signal by obtaining, on condition that the space between the pair of data extracting windows equals to the data symbol length, periodicities of the correlation value peaks based on a result of the correlation processing performed on the data extracted through the data extracting windows of different sizes and distance information of adjacent correlation value peaks with different periodicities whereby the information regarding the pilot symbol and the guide interval symbol of the communication signal is detected; and an identifying circuit which identifies a modulation mode of the unknown communication signal based on the information regarding the pilot symbol and the guide interval symbol of the communication signal.

2. The modulation mode identifying apparatus as claimed in claim 1, wherein the identifying circuit has a function of identifying an orthogonal frequency division multiplex signal, a digital modulation signal, and an analog modulation signal based on the information regarding the pilot symbol that is detected by the detection unit.

3. The modulation mode identifying apparatus as claimed in claim 1, wherein the identifying circuit has a function of identifying an orthogonal frequency division multiplex signal and a digital modulation signal based on the information regarding the guard interval symbol that is detected by the detection unit.

4. The modulation mode identifying apparatus as claimed in claim 1, wherein the Nd calculating circuit has a function of detecting the correlation value peaks by using a threshold value that can be set variably.

5. The modulation mode identifying apparatus as claimed in claim 1, wherein the Ng calculating circuit has a function of detecting, by using a threshold value that can be set variably, the correlation value peaks that are obtained by the correlation processing performed mutually on the extracted data.

6. The modulation mode identifying apparatus as claimed in claim 1, wherein the Np calculating circuit has a function of obtaining the periodicities of the correlation value peaks by using a threshold value that can be set variably.

7. A modulation mode identifying method, comprising the steps of:

a generating step for generating a duplicate signal for correlation processing based on an unknown communication signal;

an autocorrelation step for performing autocorrelation processing through carrying out sliding processing on the duplicate signal with respect to the unknown communication signal;

a detecting step for detecting information regarding a pilot symbol and a guide interval symbol of the communication signal based on a correlation value output obtained by the autocorrelation processing, wherein the detecting step further comprises:

an Nd calculating step for calculating a data symbol length of an orthogonal frequency division multiplex signal by detecting, from the correlation value output of the autocorrelation processing, correlation value peaks that are obtained based on the pilot symbol and the guard interval symbol present within the communication signal;

a window generating step for generating a pair of data extracting windows for correlation processing, the windows having different window sizes and having a space therebetween which corresponds to the detected data symbol length;

a data correlation step for performing correlation processing mutually on extracted data which are extracted through the data extracting windows with the sliding processing by changing the window sizes;

an Ng calculating step for calculating the guard interval symbol length of the orthogonal frequency division multiplex signal by detecting a correlation value peak which is obtained when the guard interval symbol length and the window size become consistent based on the correlation processing performed mutually on the extracted data; and an Np calculating step for calculating a pilot symbol length of the orthogonal frequency division multiplex signal by obtaining, on condition that the space between the pair of data extracting windows equals to the data symbol length, periodicities of the correlation value peaks based on a result of the correlation processing performed on the data extracted through the data extracting windows of different sizes and distance information of adjacent correlation value peaks with different periodicities, whereby the information regarding the pilot symbol and the guide interval symbol of the communication signal is detected; and an identifying step for identifying a modulation mode of the unknown communication signal based on the information regarding the pilot symbol and the guide interval symbol of the communication signal.

8. The modulation mode identifying method as claimed in claim 7, wherein the identifying step has a function of identifying an orthogonal frequency division multiplex signal, and a digital modulation signal, and an analog modulation signal based on the information regarding the pilot symbol.

9. The modulation mode identifying method as claimed in claim 7, wherein the identifying step has a function of identifying an orthogonal frequency division multiplex signal and a digital modulation signal based on the information regarding the guard interval symbol.

10. The modulation mode identifying method as claimed in claim 7, wherein the Nd calculating step has a function of detecting the correlation value peaks by using a threshold value that can be set variably.

11. The modulation mode identifying method as claimed in claim 7, wherein the Ng calculating step has a function of detecting the correlation value peaks that are obtained by the correlation processing performed mutually on the extracted data by using a threshold value that can be set variably.

12. The modulation mode identifying method as claimed in claim 7, wherein the Np calculating step has a function of obtaining the periodicities of the correlation value peaks by using a threshold value that can be set variably.

* * * * *